US009286257B2

(12) United States Patent
Hofmann et al.

(10) Patent No.: US 9,286,257 B2
(45) Date of Patent: Mar. 15, 2016

(54) BUS CLOCK FREQUENCY SCALING FOR A BUS INTERCONNECT AND RELATED DEVICES, SYSTEMS, AND METHODS

(75) Inventors: Richard Gerard Hofmann, Cary, NC (US); Jaya Prakash Subramaniam Ganasan, Youngsville, NC (US); Brandon Wayne Lewis, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 703 days.

(21) Appl. No.: 13/015,657

(22) Filed: Jan. 28, 2011

(65) Prior Publication Data
US 2012/0198266 A1    Aug. 2, 2012

(51) Int. Cl.
| | |
|---|---|
| G06F 13/00 | (2006.01) |
| G06F 13/40 | (2006.01) |
| G06F 1/06 | (2006.01) |
| G06F 1/32 | (2006.01) |

(52) U.S. Cl.
CPC .............. *G06F 13/4022* (2013.01); *G06F 1/06* (2013.01); *G06F 1/324* (2013.01); *G06F 1/3209* (2013.01); *Y02B 60/1217* (2013.01); *Y02B 60/1235* (2013.01)

(58) Field of Classification Search
CPC .................................. G06F 1/22; G06F 1/324
USPC ......... 710/309, 110, 240–244, 200, 260–269; 713/322
See application file for complete search history.

(56) References Cited

U.S. PATENT DOCUMENTS

| | | | |
|---|---|---|---|
| 6,954,821 B2 * | 10/2005 | Fitzsimmons et al. | ......... 710/317 |
| 7,007,121 B1 * | 2/2006 | Ansari et al. | .................. 710/113 |
| 7,496,109 B1 * | 2/2009 | Gupta et al. | .................. 370/413 |

(Continued)

FOREIGN PATENT DOCUMENTS

| | | |
|---|---|---|
| CN | 101206631 A | 6/2008 |
| CN | 101256543 A | 9/2008 |

(Continued)

OTHER PUBLICATIONS

International Search Report and Written Opinion—PCT/US2012/023194—ISA/EPO—May 29, 2012.

(Continued)

*Primary Examiner* — Tim T Vo
*Assistant Examiner* — Kim Huynh
(74) *Attorney, Agent, or Firm* — Peter Michael Kamarchik; Paul Holdaway

(57) ABSTRACT

Bus clock frequency scaling for a bus interconnect and related devices, systems, and methods are disclosed. In one embodiment, the bus interconnect comprises an interconnect network configurable to connect a master port(s) to a slave port(s). A bus interconnect clock signal clocks the interconnect network. The controller is configured to receive bandwidth information related to traffic communicated over the master port(s) and the slave port(s). The controller is further configured to scale (e.g., increase or decrease) the frequency of the bus interconnect clock signal if the bandwidth of the master port(s) and/or the slave port(s) meets respective bandwidth condition(s), and/or if the latency of the master port(s) meets a respective latency condition(s) for the master port(s). The master port(s) and/or slave port(s) can also be reconfigured in response to a change in frequency of the bus interconnect clock signal to optimize performance and conserve power.

68 Claims, 10 Drawing Sheets

(56) References Cited

U.S. PATENT DOCUMENTS

| | | |
|---|---|---|
| 7,500,042 B2 | 3/2009 | Kadota |
| 2004/0123011 A1 | 6/2004 | Murayama et al. |
| 2005/0044442 A1 | 2/2005 | Barr et al. |
| 2005/0216643 A1* | 9/2005 | Munguia .................. 710/309 |
| 2007/0006006 A1* | 1/2007 | Henson .................... 713/322 |
| 2008/0162967 A1 | 7/2008 | Wilson et al. |

FOREIGN PATENT DOCUMENTS

| | | |
|---|---|---|
| JP | H07210506 A | 8/1995 |
| JP | 2003271261 A | 9/2003 |
| JP | 2004126646 A | 4/2004 |
| JP | 2004519769 A | 7/2004 |
| JP | 2005071367 A | 3/2005 |
| JP | 2006119998 A | 5/2006 |
| JP | 2007034459 A | 2/2007 |
| JP | 2007219962 A | 8/2007 |

OTHER PUBLICATIONS

Leoce G. et al., "Mixed Signal SystemC modelling of a SoC architecture with Dynamic Voltage Scaling", Proc. of SPIE, vol. 6590, pp. 65901H-1-65901H-11, 2007.

Simone Marinelli et al., "Dynamic Power Management of a System on Chip based on AMBA AHB bus", Proc. of SPIE, vol. 6590, pp. 65901K-1-65901K-10, 2007.

* cited by examiner

BUS CLOCK FREQUENCY SCALING FOR A BUS INTERCONNECT AND RELATED DEVICES, SYSTEMS, AND METHODS

BACKGROUND

I. Field of the Disclosure

The technology of the disclosure relates to electronic bus interconnects for communicatively interfacing diverse electronic components together. As an example, the bus interconnects can be provided in system-on-a-chip (SOC) designs.

II. Background

Portable electronic devices, such as mobile phones, personal digital assistants (PDAs), and the like, are commonly manufactured using application specific integrated circuit (ASIC) designs. Developments in achieving high levels of silicon integration have allowed creation of complicated ASICs and field programmable gate array (FPGA) designs. These ASICs and FPGAs may be provided in a single chip to provide a system-on-a-chip (SOC). An SOC provides multiple functioning subsystems on a single semiconductor chip, such as for example, processors, multipliers, caches, and other electronic components. SOCs are particularly useful in portable electronic devices because of their integration of multiple subsystems that can provide multiple features and applications in a single chip. Further, SOCs may allow smaller portable electronic devices by use of a single chip that may otherwise have been provided using multiple chips.

To communicatively interface multiple diverse components or subsystems together within a circuit provided on a chip(s), which may be an SOC as an example, an interconnect communications bus, also referred to as a bus interconnect, is provided. The bus interconnect is provided using circuitry, including clocked circuitry, which may include as examples registers, queues, and other circuits to manage communications between the various subsystems. The circuitry in the bus interconnect is clocked with one or more clock signals generated from a master clock signal that operates at the desired bus clock frequency(ies) to provide the throughput desired. In applications where reduced power consumption is desirable, the bus clock frequency can be lowered according to the well known equation of power consumption being equal to $fCV^2$, where 'f' is frequency, 'C' is capacitance, and 'V' is voltage. However, lowering the bus clock frequency lowers performance of the bus interconnect. If lowering the bus clock frequency increases bus latency beyond latency requirements or conditions for the subsystems coupled to the bus interconnect, the performance of the subsystem may degrade or fail entirely. Rather than risk degradation or failure, the bus clock frequency may be set to a higher frequency to reduce latency and provide performance margin. However, providing a higher bus clock frequency for the bus interconnect consumes more power.

SUMMARY OF THE DISCLOSURE

Embodiments disclosed in the detailed description include bus clock frequency scaling for bus interconnects, and related devices, systems, methods, and computer-readable mediums. The bus interconnect is configurable to allow one or more master devices, each connected to a master port among a plurality of master ports of the bus interconnect, to be communicatively connected to any of a plurality of slave devices each connected to a slave port of the bus interconnect. The master port(s) and slave port(s) may be configurable to operate at different frequencies to facilitate interconnection of a master device(s) operating at one frequency to communicate with a slave device(s) operating at a different frequency. A bus interconnect clock signal is provided to clock the interconnect network. To conserve power consumed by the bus interconnect, the frequency of a bus interconnect clock signal may be scaled (e.g., increased or decreased) based on respective bandwidth and/or respective latency conditions. In this manner, power consumption by the bus interconnect can be optimized while maintaining the desired performance condition requirements of the bus interconnect.

In this regard in one embodiment, a bus interconnect is provided. The bus interconnect comprises an interconnect network configurable to connect one or more master ports among a plurality of master ports to one or more slave ports. The bus interconnect also comprises a controller configured to generate a bus interconnect clock signal to clock the interconnect network. The controller is configured to receive at least one first bandwidth information related to traffic communicated over the at least one master port. The controller is also configured to receive at least one second bandwidth information related to traffic communicated over the at least one slave port. The controller is also configured to scale (e.g., increase or decrease) a frequency of the bus interconnect clock signal in response to at least one of: (a) the at least one first bandwidth information meeting a respective at least one first bandwidth condition, and (b) the at least one second bandwidth information meeting a respective at least one second bandwidth condition.

The controller may be configured to decrease the frequency of the bus interconnect clock signal in response to the at least one first bandwidth information meeting a respective at least one first bandwidth condition and the at least one second bandwidth information meeting a respective at least one second bandwidth condition. The controller may also be configured to increase the frequency of the bus interconnect clock signal in response to the at least one first bandwidth information meeting a respective at least one first bandwidth condition or the at least one second bandwidth information meeting a respective at least one second bandwidth condition.

In another embodiment, a method of scaling a bus interconnect clock signal for a bus interconnect is provided. The method comprises receiving at least one first bandwidth information related to traffic communicated over at least one master port among a plurality of master ports connected to an interconnect network that is configured to connect the at least one master port to at least one slave port. The method also comprises receiving at least one second bandwidth information related to traffic communicated over the at least one slave port. The method also comprises scaling a frequency of the bus interconnect clock signal clocking the interconnect network in response to at least one of (a) the at least one first bandwidth information meeting a respective at least one first bandwidth condition, and (b) the at least one second bandwidth information meeting a respective at least one second bandwidth condition.

In another embodiment, a computer-readable medium is provided. The computer-readable medium has stored thereon computer executable instructions to cause a bus interconnect, comprising an interconnect network configurable to connect a master port among a plurality of master ports to a slave port(s), to scale (e.g., increase or decrease) the frequency of a bus interconnect clock signal generated by a controller and configured to clock the interconnect network in response to at least one of: (a) at least one first bandwidth information related to traffic communicated over the at least one master port meeting a respective at least one first bandwidth condition, and (b) at least one second bandwidth information related to traffic communicated over the at least one slave port meeting a respective at least one second bandwidth condition.

In other embodiments, the controller may also be configured to scale (e.g., increase or decrease) the frequency of the bus interconnect clock signal additionally only if the latency for the master port(s) meets a respective latency condition for the master port(s). For example, the controller may be configured to decrease the frequency of the bus interconnect clock signal if the latency for the master port(s) is less than a maximum latency threshold for the master port(s), and the bandwidth(s) of the master and slave port(s) are less than headroom bandwidth threshold(s). As another example, the controller may be configured to increase the frequency of the bus interconnect clock signal if the latency for the master port(s) is greater than a maximum latency threshold for the master port(s), or the bandwidths of the master or slave port(s) are greater than headroom bandwidth threshold(s).

Further, embodiments disclosed herein provide for the ability of the master port(s) and the slave port(s) to be configured for synchronous and/or rising-edge synchronous operation in response to a change to the bus interconnect clock signal, if possible, to reduce or avoid latencies in the bus interconnect. The master port interface(s) and slave port interface(s) may also be configured for asynchronous operation to the bus interconnect clock signal.

DETAILED DESCRIPTION

Figure 1:
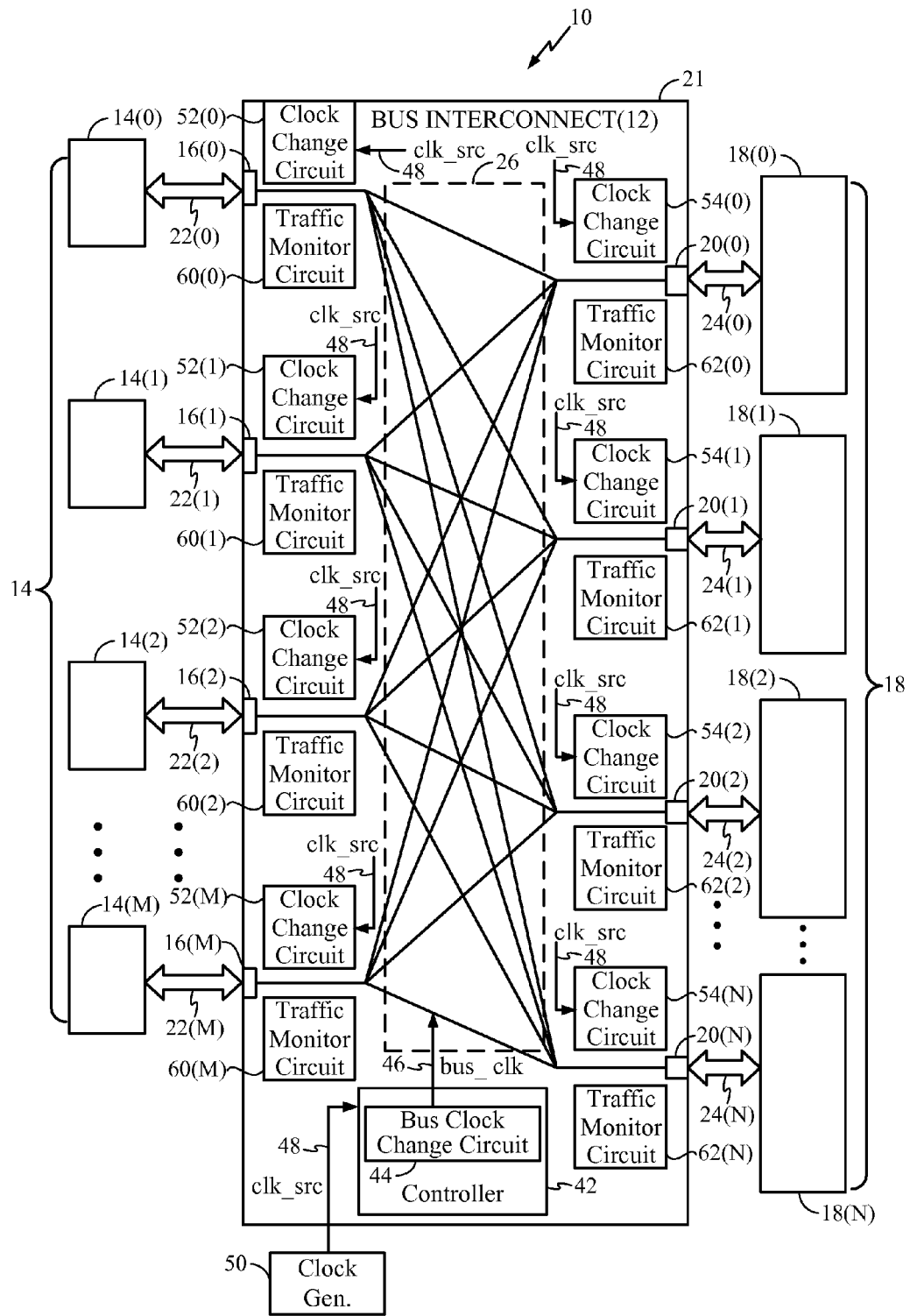
FIG. 1 is a block diagram of an exemplary bus interconnect system comprising an interconnect network configured to connect a plurality of master ports to any of a plurality of slave ports through the interconnect network clocked using a frequency-scaled bus interconnect clock signal.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include bus clock frequency scaling for bus interconnects, and related devices, systems, methods, and computer-readable mediums. The bus interconnect is configurable to allow one or more master devices, each connected to a master port among a plurality of master ports of the bus interconnect, to be communicatively connected to any of a plurality of slave devices each connected to a slave port of the bus interconnect. The master port(s) and slave port(s) may be configurable to operate at different frequencies to facilitate interconnection of a master device(s) operating one frequency to communicate with a slave device(s) operating at a different frequency. A bus interconnect clock signal is provided to clock the interconnect network. To conserve power consumed by the bus interconnect, the frequency of a bus interconnect clock signal may be scaled (e.g., increased or decreased) based on respective bandwidth and/or respective latency conditions. In this manner, power consumption by the bus interconnect can be optimized while maintaining the desired performance condition requirements of the bus interconnect.

In this regard in one embodiment, FIG. 1 is a block diagram of an exemplary bus interconnect system 10. The bus interconnect system 10 is comprised of a bus interconnect 12. As examples, the bus interconnect 12 may be provided by a field programmable gate array (FPGA), an application specific integrated circuit (ASIC), controller, micro-controller or microprocessor that executes software instructions, or any combination thereof. As will be described in more detail below, the bus interconnect 12 is configurable to allow one or more master devices 14(0-M), each connected to a master port 16(0-M) provided by the bus interconnect 12, to be communicatively connected to one or more of a plurality of slave devices 18(0-N), each connected to a slave port 20(0-N) provided by the bus interconnect 12. The bus interconnect 12 may be provided in a semiconductor die 21 and may be provided in a system-on-a-chip (SOC) integrated circuit design, if desired. The master devices 14(0-M) and the slave devices 18(0-N) can be any type of electronic device or subsystem, examples of which include but are not limited to a central processing unit (CPU), a digital signal processor (DSP), a direct memory access (DMA) controller, a memory controller, a graphics processor, etc.

Figure 2:
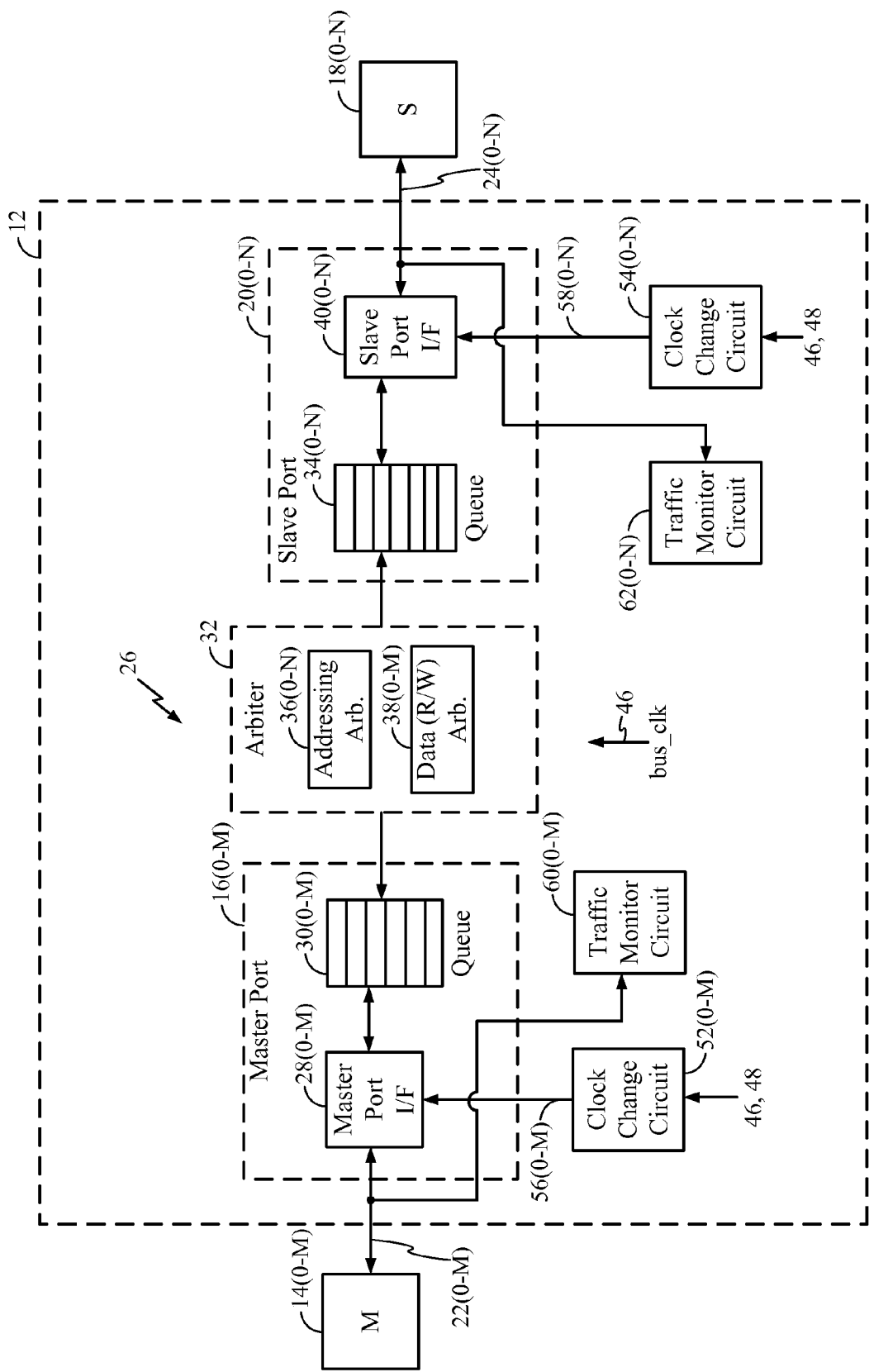
FIG. 2 is a block diagram of exemplary circuitry subsystems in a communication path setup in the bus interconnect of FIG. 1 between a master port connected to a slave port.

Communications are supported between the master devices 14(0-M) and the bus interconnect 12 through master port buses 22(0-M) coupled to the master ports 16(0-M). Similarly, communications are supported between the slave devices 18(0-N) and the bus interconnect 12 through slave port buses 24(0-N) coupled to the slave ports 20(0-N). Providing separate master port buses 22(0-M) and slave port buses 24(0-N) allows the bus interconnect 12 to interconnect master devices 14(0-M) and slave devices 18(0-N) operating at different clock frequencies. To configure a connection between a master device 14(0-M) and a particular slave device 18(0-N), the bus interconnect 12 contains an interconnect network 26. As illustrated in FIG. 2, the interconnect network 26 includes clocked circuitry, such as gates, latches, and registers as examples, that is configurable to couple a desired master device 14(0-M) and desired slave device 18(0-N). For example as illustrated in FIG. 2, exemplary components provided in the bus interconnect 12 are illustrated that are configurable to provide a communication path in the interconnect network 26 between one master device 14(0-M) and one slave device 18(0-N).

With reference to FIG. 2, the master ports 16(0-M) each include master port interfaces 28(0-M) connected to master port buses 22(0-M) to receive communications from the master devices 14(0-M). Because the interconnect network 26 may be operating at a different frequency from both the master port buses 22(0-M) and the slave port buses 24(0-N), master port queues 30(0-M) may be provided to store bus transactions or commands that are provided to an arbiter(s) 32 to arbitrate communications between master port queues 30(0-M) and slave port queues 34(0-N). The arbiter 32 may include a separate addressing arbiter 36(0-N) associated with the slave ports 20(0-N) to arbitrate bus transactions to the slave ports 20(0-N) and a data (read/write) arbiter 38(0-M) associated with the master ports 16(0-M) to arbitrate read data and write completion responses coming from the slave ports 20(0-N). The slave port queues 34(0-N) provide communications to slave port interfaces 40(0-N) connected to the slave port buses 24(0-N). Note that although FIG. 2 illustrates a communication path between one master port 16(0-M) coupled to one master device 14(0-M), to one slave port 20(0-N) coupled to one slave device 18(0-N), the arbiters 36(0-N), 38(0-M) provided in the bus interconnect 12 can be configured to arbitrate communication paths between any of the master ports 16(0-M) and slave ports 20(0-N).

With reference back to FIG. 1, the communication path in the interconnect network 26 is configurable by the arbiters 36(0-N), 38(0-M) provided in the bus interconnect 12 to configure the interconnection between the desired master device 14(0-M) and slave device 18(0-N). A controller 42, which may be a clock controller, is provided that includes a bus clock change circuit 44 that is configured to generate a bus interconnect clock signal (bus_clk) 46 to clock the clocked circuitry in the interconnect network 26. The controller 42 controls the frequency of the bus interconnect clock signal 46 by issuing commands to the bus clock change circuit 44. The bus clock change circuit 44 generates the bus interconnect clock signal 46 from a clock source signal (clk_src) 48 generated by a clock generator 50. The clock generator 50 is shown in FIG. 1 as being provided externally from the bus interconnect 12, but the clock generator 50 could alternatively be included in the bus interconnect 12 if desired. The clock generator 50 generates the clock source signal 48 at a source frequency, which may then be provided or divided by the bus clock change circuit 44 to provide the bus interconnect clock signal 46 to clock the interconnect network 26. Note that the controller 42 is illustrated as being included in the bus interconnect 12, but the controller 42 could alternatively be provided externally to the bus interconnect 12 if desired.

Lowering the frequency of the bus interconnect clock signal 46 can reduce power consumption of the bus interconnect 12 according to $fCV^2$, where 'f' is frequency, 'C' is capacitance, and 'V' is voltage. The capacitance 'C' is based on a clock buffering tree for the bus interconnect 12 and the circuit that drives the clock buffering tree. Lowering the frequency of the bus interconnect clock signal 46 can increase latency of bus transactions performed by the bus interconnect 12 and thus reduces performance of the bus interconnect 12. In some instances, lowering the frequency of the bus interconnect clock signal 46 will not cause an unacceptable degradation (e.g., by exceeding a defined condition, e.g., a threshold(s)) of the bandwidths and latencies of the master ports 16(0-M) and slave ports 20(0-N). At other times, lowering the frequency of the bus interconnect clock signal 46 will cause an unacceptable degradation (e.g., by exceeding a defined condition, e.g., a threshold(s)) of the bandwidths and latencies of the master ports 16(0-M) and slave ports 20(0-N). Rather than maintain the frequency of the bus interconnect clock signal 46 at a higher frequency more than sufficient to maintain respective bandwidth conditions configured for the master ports 16(0-M) and slave ports 20(0-N) and respective latency conditions configured for the master ports 16(0-M), which may provide performance margin in the bus interconnect 12 that consumes additional power unnecessarily, embodiments disclosed herein scale the frequency of the bus interconnect clock signal 46.

By respective bandwidth conditions, it is meant that bandwidth conditions used to determine scaling of the bus interconnect clock signal 46 may be configured for each master port 16(0-M) and slave port 20(0-N). As non-limiting examples, these bandwidth conditions may be configured uniquely to each master port 16(0-M) and each slave port 20(0-N), configured as the same for all master ports 16(0-M), configured as the same for all slave ports 20(0-N), or configured as the same for all master ports 16(0-M) and slave ports 20(0-N), or any combination thereof. Similarly, by respective latency conditions, it is meant that latency conditions used to determine scaling of the bus interconnect clock signal 46 may be configured for each master port 16(0-M). As non-limiting examples, latency conditions may be uniquely configured for each master port 16(0-M), or configured as the same for all master ports 16(0-M).

For example, if it is determined that the performance of the bus interconnect 12 exceeds the bandwidth needs of the master ports 16(0-M) and slave ports 20(0-N), the frequency of the bus interconnect clock signal 46 can be lowered to conserve power without impacting performance. If the frequency of the bus interconnect clock signal 46 lowers the bandwidth of the master ports 16(0-M) and slave ports 20(0-N) below desired performance, the frequency of the bus interconnect clock signal 46 can be raised to increase performance of the bus interconnect 12.

Further, the master devices 14(0-M) may have a maximum latency for performing transactions through the bus interconnect 12. The maximum latency is the maximum acceptable latency between the broadcast of a transaction and receipt of a response. For example, read latency is the time between when a read request is communicated from a master device 14(0-M) through the bus interconnect 12 to a slave device 18(0-N) and when the read response is received at the master device 14(0-M). Write latency is the time between when a write request is communicated from a master device 14(0-M) through the bus interconnect 12 to a slave device 18(0-N) and when the data is written to the slave device 18(0-N) and a write response is received at the master device 14(0-M). Thus, in certain embodiments, if it is additionally determined that the performance of the bus interconnect 12 exceeds the maximum latency configured (i.e., latency is less than the maximum threshold condition) for the master ports 16(0-M) in addition to the performance of the bus interconnect 12 exceeding the bandwidth needs of the master ports 16(0-M) and slave ports 20(0-N), the frequency of the bus interconnect clock signal 46 can be lowered to conserve power. If the frequency of the bus interconnect clock signal 46 causes the bus interconnect 12 not to meet respective maximum latency conditions configured for the master ports 16(0-M), the frequency of the bus interconnect clock signal 46 can be raised to increase performance of the bus interconnect 12 and thereby reduce access latencies.

In this regard, as illustrated in FIGS. 1 and 2, master port traffic monitor circuits 60(0-M) and slave port traffic monitor circuits 62(0-N) are provided for each master port 16(0-M) and slave port 20(0-N), respectively. The master port traffic monitor circuits 60(0-M) and slave port traffic monitor circuits 62(0-N) are configured to monitor traffic or bandwidth of the master ports 16(0-M) and slave ports 20(0-N), respectively, by monitoring communications on the master port buses 22(0-M) and slave port buses 24(0-N), respectively. The master port traffic monitor circuits 60(0-M) are also configured to monitor latency of the master ports 16(0-M). This bandwidth information is provided to the controller 42 to use in scaling (e.g., increasing or decreasing) the frequency of the bus interconnect clock signal 46.

As will also be discussed in more detail below, the frequency of the bus interconnect clock signal 46 may be scaled. For example, the frequency of the bus interconnect clock signal 46 may be lowered to conserve power while maintaining the respective bandwidth needs of the master ports 16(0-M) and slave ports 20(0-N) and respective latency conditions configured for the master ports 16(0-M), if the frequency of the master port buses 22(0-N) and slave port buses 24(0-N) can be changed. In this regard as illustrated in FIGS. 1 and 2, the controller 42 in this embodiment also provides the clock source signal 48 to clock change circuits 52(0-M) and clock change circuits 54(0-N). The controller 42 can issue commands to each of the clock change circuits 52(0-M), 54(0-N) to change the frequency of each of the master port buses 22(0-M) and slave port buses 24(0-N). As illustrated in FIG. 2, the clock change circuits 52(0-M) and clock change circuits 54(0-N) are clock generators that provide a master port clock signal 56(0-M) and a slave port clock signal 58(0-N), respectively, to the master port interface 28(0-M) and the slave port interface 40(0-N), respectively.

Figure 3A:
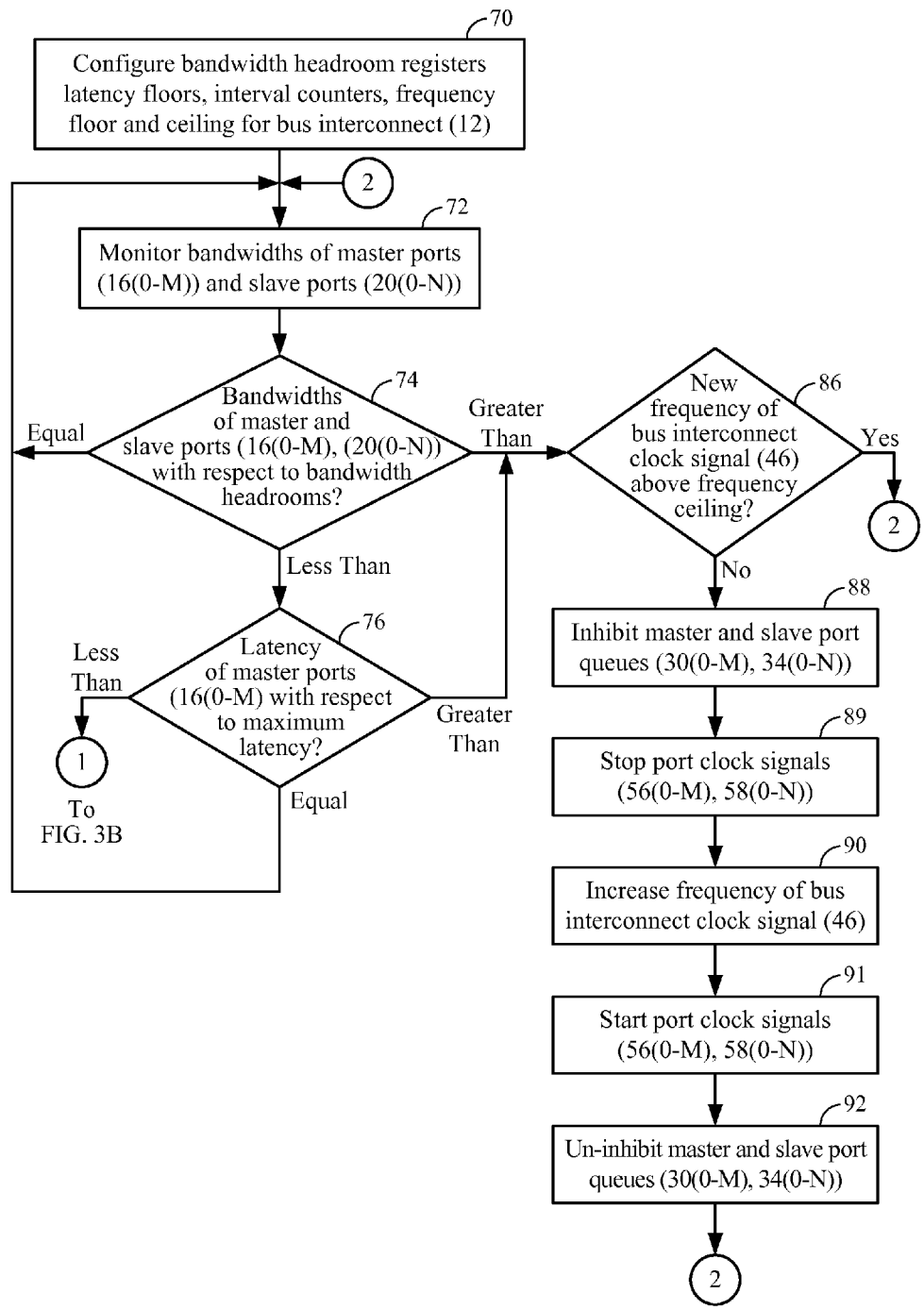
FIGS. 3A and 3B illustrate an exemplary flowchart providing frequency scaling of an bus interconnect clock signal for the bus interconnect of FIG. 1, based on respective bandwidth conditions configured for the master port(s) and slave port(s) and/or respective latency conditions configured for the master port(s)
Figure 3B:
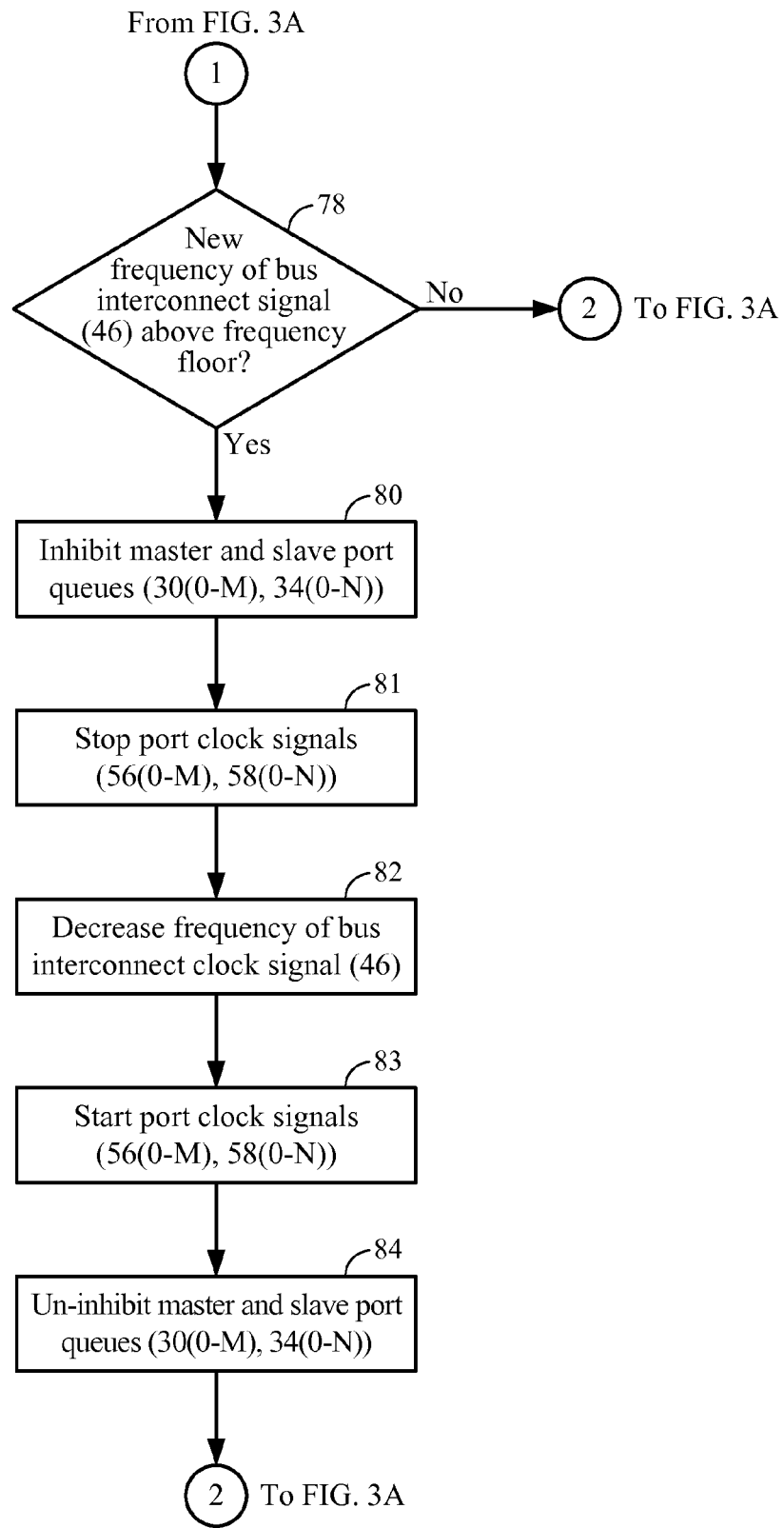

FIGS. 3A and 3B illustrate an exemplary flowchart providing frequency scaling of the bus interconnect clock signal 46 for the bus interconnect 12 of FIG. 1 based on respective bandwidth conditions configured for the master ports 16(0-M) and slave ports 20(0-N) and respective latency conditions configured for the master ports 16(0-M). The flowchart in FIGS. 3A and 3B is performed by the controller 42 in this embodiment. Before entering a frequency scaling loop, in this example, the controller 42 configures respective bandwidth and latency conditions by configuring headroom bandwidth registers, and maximum latency and interval counters for the master ports 16(0-M) and the slave ports 20(0-N) (block 70 in FIG. 3A). The controller 42 also configures the frequency floor and the frequency ceiling for the bus interconnect 12 (block 70 in FIG. 3A). The headroom bandwidth registers provide the amount of excess bandwidth that needs to be retained as available on the master ports 16(0-M) and the slave ports 20(0-N) as bandwidth conditions. Excess bandwidth may be configured so that there is headroom to detect increases in bandwidth to adjust frequencies accordingly.

For example, the headroom bandwidth register may provide a bandwidth condition that read or write data traffic should not consume more than ninety percent (90%) bandwidth of the maximum bandwidth threshold on one or more of the master port buses 22(0-M) or one or more of the slave port buses 24(0-N) at any given time. The respective maximum latency condition for each master port 16(0-M) can be the maximum threshold latency conditions that must be met by the bus interconnect 12 for data communications between the master ports 16(0-M) and the slave ports 20(0-N). Interval counters are used by the traffic monitoring circuits 60(0-M), 62(0-N) to monitor bandwidth of the master ports 16(0-M) and slave ports 20(0-N), and latency of the master ports 16(0-M). The frequency floor and frequency ceiling provides the minimum and maximum frequencies, respectively, of the bus interconnect clock signal 46 designated for the bus interconnect 12 to operate which should not be violated regardless of the respective bandwidth conditions configured for the master ports 16(0-M) and slave ports 20(0-N) and respective latency conditions configured for the master ports 16(0-M).

The controller 42 monitors the bandwidths of the master ports 16(0-M) and the slave ports 20(0-N) using the traffic monitoring circuits 60(0-M), 62(0-N) (block 72 in FIG. 3A). The controller 42 receives bandwidth information related to traffic communicated over the master ports 16(0-M) and the slave ports 20(0-N). As discussed, below, if the bandwidths do not meet respective bandwidth conditions configured for the master ports 16(0-M) and slave ports 20(0-N), the frequency of the bus interconnect clock signal 46 may be scaled. For example, if the bandwidths of the master ports 16(0-M) and slave ports 20(0-M) are less than the headroom bandwidth thresholds configured for all of the master ports 16(0-M) and the slave ports 20(0-N) (block 74 in FIG. 3A), lowering the frequency of the bus interconnect clock signal 46 may be possible. If the controller 42 determines that the bandwidths are equal to the headroom bandwidth configured for the master ports 16(0-M) and the slave ports 20(0-N) (block 74 in FIG. 3A), the controller 42 can return to continue monitoring of the master ports 16(0-M) and/or slave ports 20(0-N) (block 72 in FIG. 3A). If the controller 42 determines in block 72 that any of the bandwidths are greater than the headroom bandwidth configured for the master ports 16(0-M) and the slave ports 20(0-N), the controller 42 can increase the frequency of the bus interconnect clock signal 46, as will be discussed below with regard to block 86 in FIG. 3A. If the controller 42 determines in block 74 in FIG. 3A that the bandwidths are less than the headroom bandwidth configured for the master ports 16(0-M) and the slave ports 20(0-N), the controller 42 determines if the latencies of the master ports 16(0-M) meet a respective latency condition, such as maximum latency thresholds, configured for the master ports 16(0-M) (block 76 in FIG. 3A). If so, the controller 42 may be able to lower the frequency of the bus interconnect clock signal 46 if the new lower frequency would be above a frequency floor configured for the bus interconnect 12. In this regard, the controller 42 determines if the new lower frequency of the bus interconnect clock signal 46 would be above a frequency floor configured for the bus interconnect 12 (block 78 in FIG. 3B). If not, the controller 42 returns to monitoring the bandwidths of the master ports 16(0-M) and slave ports 20(0-N) and the latencies of the master ports 16(0-M) (blocks 72, 74, 76 in FIG. 3A).

Figure 6:
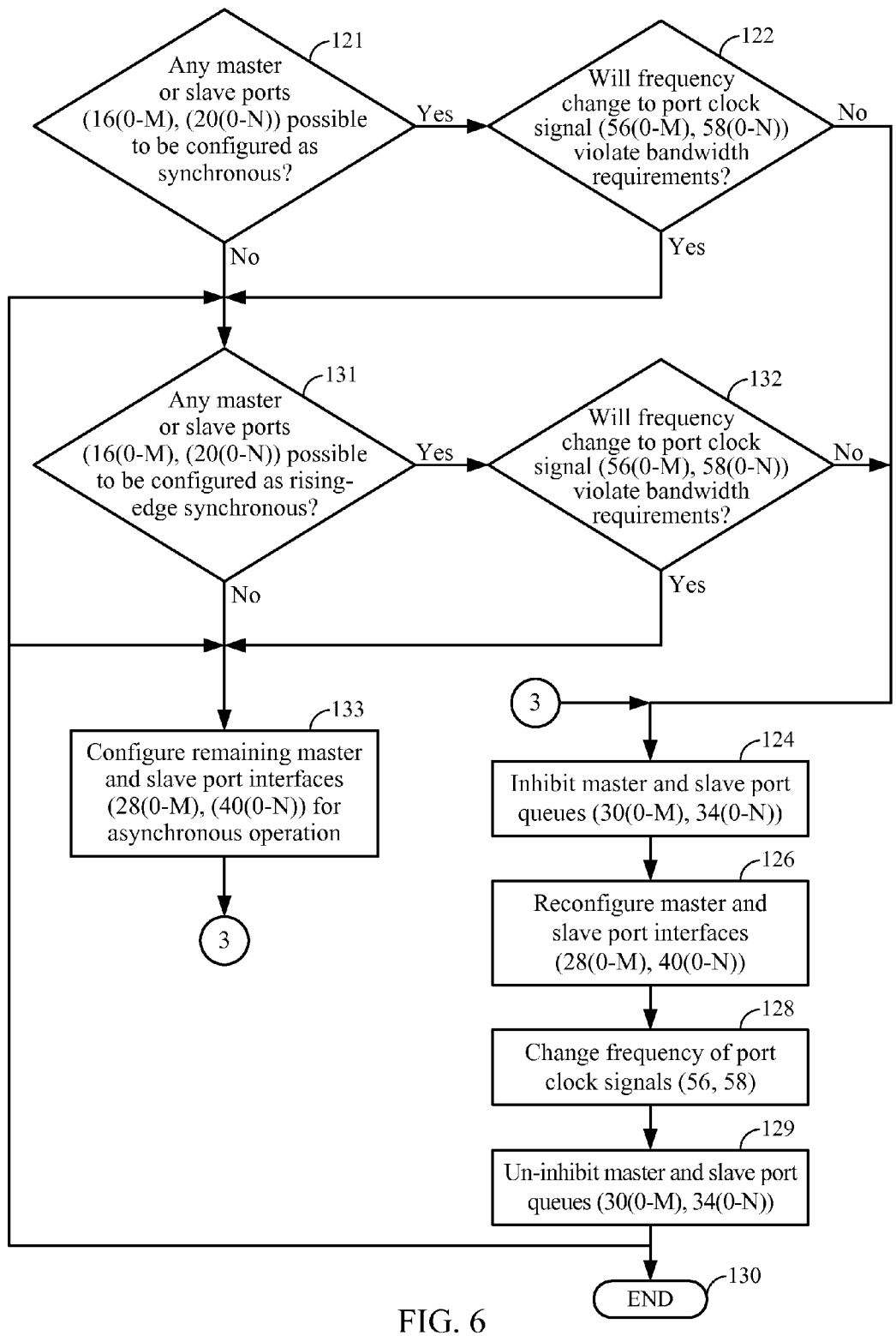
FIG. 6 is a flowchart illustrating an exemplary configuration of the port clock signals for synchronous, rising-edge synchronous, and asynchronous operation to the bus interconnect clock signal when the bus interconnect clock signal is scaled.

If the new lower frequency of the bus interconnect clock signal 46 would be above a frequency floor configured for the bus interconnect 12 (block 78 in FIG. 3B), the controller 42 can lower the frequency of the bus interconnect clock signal 46 to decrease power consumption without impacting performance of the master ports 16(0-M) and the slave ports 20(0-N) beyond configured performance levels. In this embodiment, the controller 42 inhibits only the necessary master and slave port queues 30(0-M), 34(0-N) in FIG. 2 that will require reconfiguration of synchronization mode due to the scaling of the frequency of the bus interconnect clock signal 46 (block 80 in FIG. 3B). FIG. 6 discussed below provides an example of reconfiguration of synchronization mode due to the scaling of the frequency of the bus interconnect clock signal 46. With reference back to FIG. 3B, these master port queues 30(0-M) and slave port queues 34(0-N) will not process bus transactions until the bus interconnect clock signal 46 frequency is lowered and the port clock signals 56(0-M), 58(0-N) are available (block 80 in FIG. 3B). Only inhibiting necessary master and slave port queues 30(0-M), 34(0-N) allows other master ports 16(0-M) and slave ports 20(0-N) to continue performing bus transactions during a change in frequency of the bus interconnect clock signal 46. The controller 42 then stops the necessary master and slave port clock signals 56(0-M), 58(0-N) prior to a change in resynchronization, if possible, (block 81 in FIG. 3B) before the frequency of the bus interconnect clock signal 46 is decreased (block 82 in FIG. 3B). After the frequency of the bus interconnect clock signal 46 is decreased, the master and slave port clock signals 56(0-M), 58(0-N) are restarted (block 83), and the master and slave port queues 30(0-M), 34(0-N) are un-inhibited (block 84). Stopping the master and slave port clock signals 56(0-M), 58(0-N), although not required because the necessary master and slave port queues 30(0-M), 34(0-N) are inhibited, may reduce power consumption during the reconfiguration for resynchronization. The frequency of the bus interconnect clock signal 46 may be lowered in increments that are configured in the controller 42.

If the bandwidth conditions or the latency conditions in blocks 74 or 76 would be violated according to the configurations provided in the bus interconnect 12, the frequency of the bus interconnect clock signal 46 may need to be increased as illustrated in FIG. 3A. If the new frequency of the bus interconnect clock signal 46 after a frequency increase would not be above a frequency ceiling configured for the bus interconnect 12 (block 86 in FIG. 3A), the controller 42 can increase the frequency of the bus interconnect clock signal 46. In this instance, the controller 42 inhibits the necessary master port queues 30(0-M) and slave port queues 34(0-N) in FIG. 2 that will require reconfiguration due to the increase in frequency of the bus interconnect clock signal 46 that will be made (block 88 in FIG. 3A). In this regard, these master port queues 30(0-M) and slave port queues 34(0-N) will not process bus transactions until the frequency of the bus interconnect clock signal 46 is increased and the port clock signals 56(0-M), 58(0-N) are available. Again, only inhibiting necessary master and slave port queues 30(0-M), 34(0-N) allows other master ports 16(0-M) and slave ports 20(0-N) to continue performing bus transactions during a change in frequency of the bus interconnect clock signal 46. The controller 42 then stops the necessary master and slave port clock signals 56(0-M), 58(0-N) to allow a change in resynchronization, if possible, (block 89 in FIG. 3B) before the frequency of the bus interconnect clock signal 46 is increased (block 90 in FIG. 3B).

The controller 42 (either sequentially or in parallel) increases the frequency of the bus interconnect clock signal 46 to the new higher frequency (block 90 in FIG. 3A), and the master and slave port clock signals 56(0-M), 58(0-N) are restarted (block 91 in FIG. 3A). The controller 42 un-inhibits any master port queues 30(0-M) and slave port queues 34(0-N) that were inhibited in block 88 in FIG. 3A to allow communications to begin with the bus interconnect clock signal 46 at the new higher frequency (block 92 in FIG. 3A). The controller 42 then returns to monitor the bandwidths of the master ports 16(0-M) and slave ports 20(0-N) and latencies of the master ports 16(0-M) (blocks 72, 74, 76 in FIG. 3A).

Figure 4:
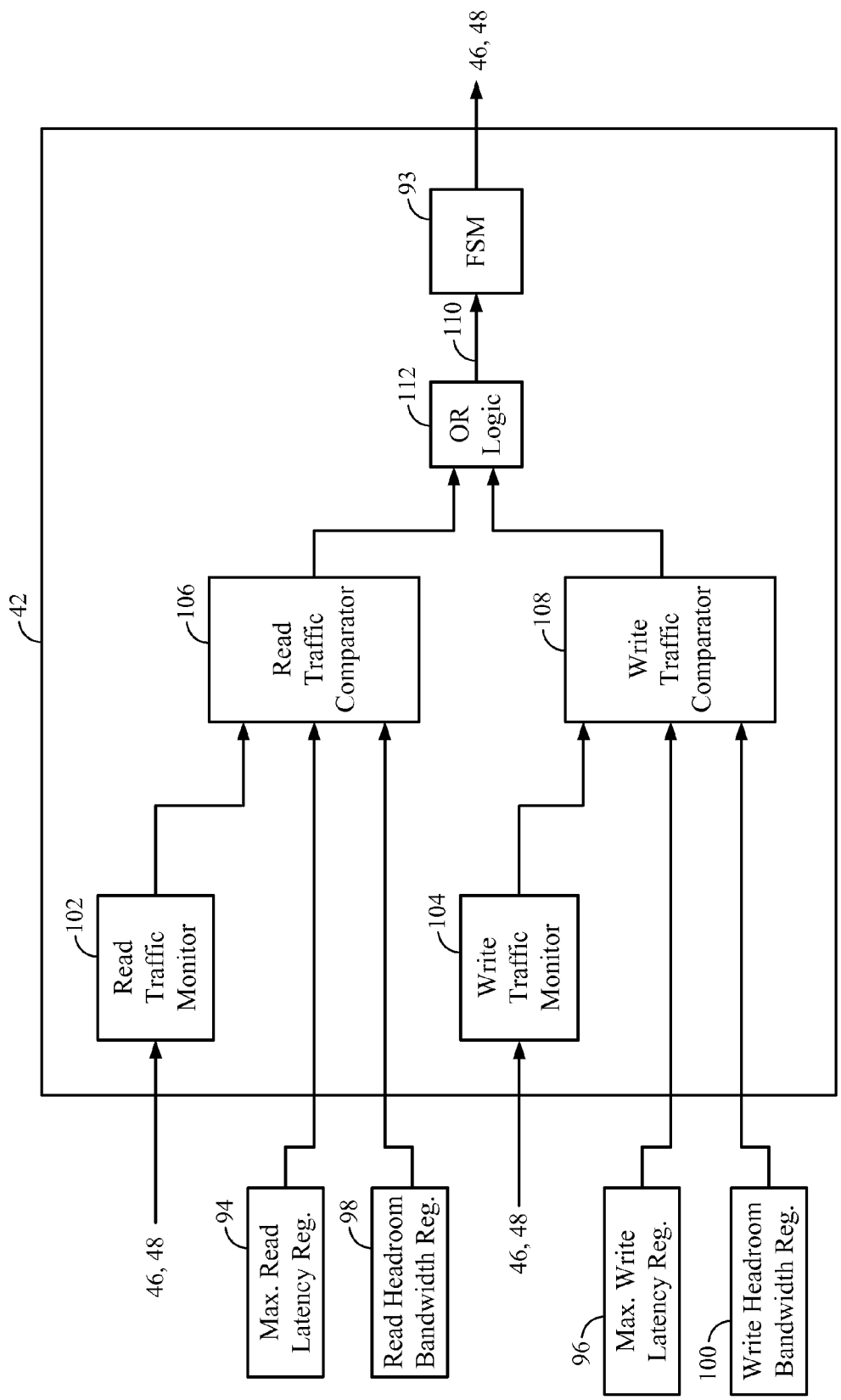
FIG. 4 is block diagram of exemplary components included in a controller provided in the bus interconnect of FIG. 1.

FIG. 4 is block diagram of exemplary components included in the controller 42 provided in the bus interconnect 12 of FIG. 1 to determine the scaling of the frequency of the bus interconnect clock signal 46. In this regard, a finite state machine (FSM) 93 is provided that receives information regarding the bandwidth of transactions of the master ports 16(0-M) and slave ports 20(0-N) and latency of the master ports 16(0-M) to determine scaling of the bus interconnect clock signal 46. The FSM 93 may be provided in hardware, software, or a combination of both.

With continuing reference to FIG. 4, a maximum read latency register 94 and a maximum write latency register 96 are provided to configure the latency condition that must be satisfied for the master ports 16(0-M) in order to scale the bus interconnect clock signal 46. For example, the latency condition may be a maximum latency threshold. In one example as illustrated in FIG. 4, a read headroom bandwidth register 98 and a write headroom bandwidth register 100 are provided to configure the minimum headroom bandwidth that must be satisfied for the master ports 16(0-M) or slave ports 20(0-N) in order to scale the bus interconnect clock signal 46. A read traffic monitor 102 and a write traffic monitor 104 are also provided to determine read and write latency and bandwidth information received from the traffic monitor circuits 60(0-M) or 62(0-N) for the master ports 16(0-M) or slave ports 20(0-N). A read traffic comparator 106 and a write traffic comparator 108 are provided to determine if the read and write latencies are below the maximum read and write latency registers 94, 96, respectively, and if the read and write bandwidths are within the limit (i.e., less than or equal) of the bandwidths stored in the read and write headroom bandwidth registers 98, 100, respectively.

With continuing reference to FIG. 4, if either the maximum read latency or maximum write latency is not met or the headroom for the bandwidths are not maintained, as provided by an output signal 110 from OR logic 112, the FSM 93 will register this condition and the frequency of the bus interconnect clock signal 46 will not be permitted to be lowered. As examples, a maximum latency threshold based on absolute time, such as one hundred nanoseconds (100 ns) for example, or alternatively based on a relative timing using a reference clock signal as an example, may be configured for the maximum read latency register 94 and the maximum write latency register 96 as latency conditions. An example of headroom bandwidth configured in the read headroom bandwidth register 98 and/or the write headroom bandwidth register 100 may be ninety percent (90%) of maximum bandwidth possible at the current frequency of the bus interconnect clock signal 46.

Figure 5:
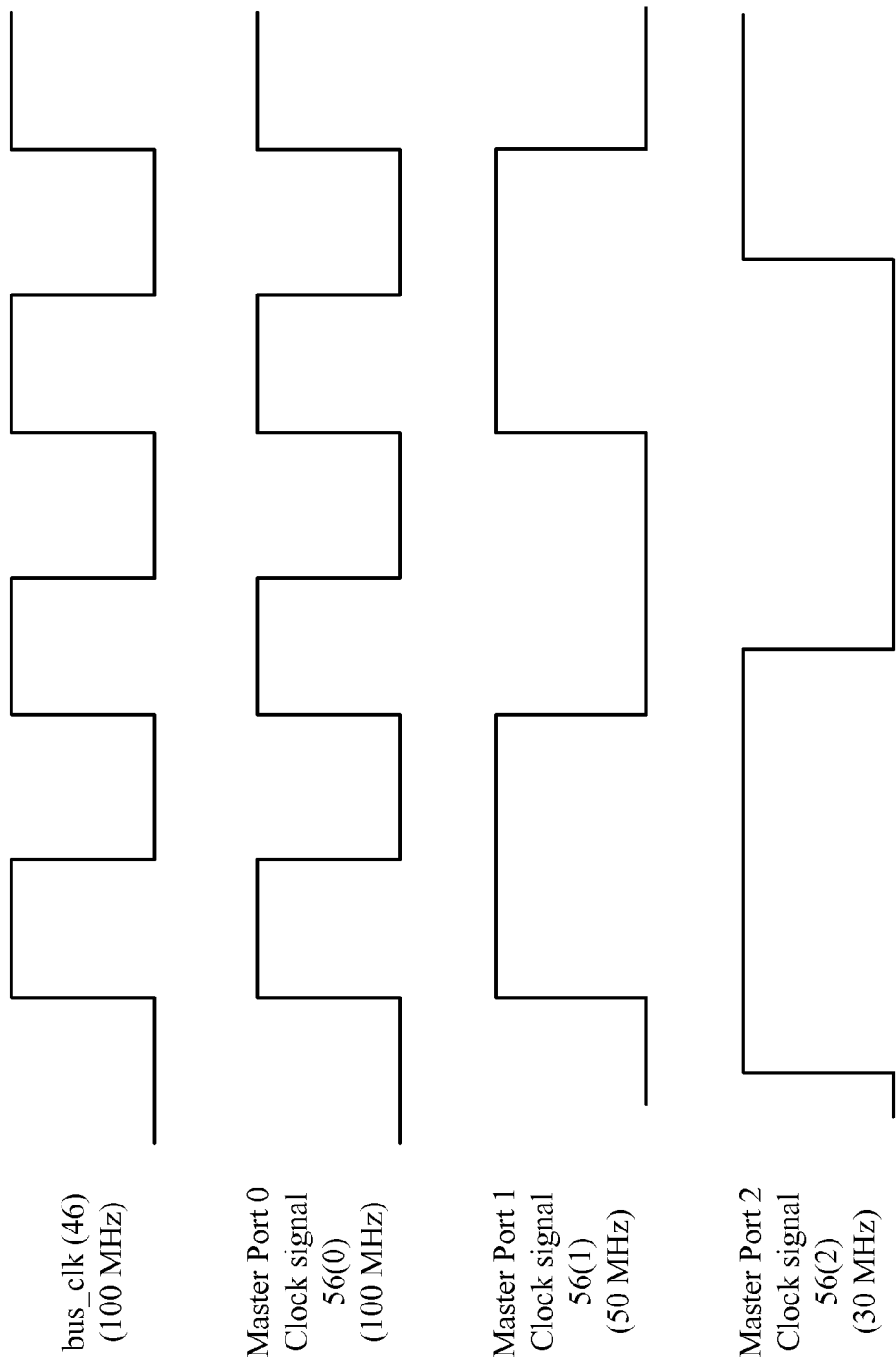
FIG. 5 is an exemplary diagram illustrating port clock signals operating synchronous, rising-edge synchronous, and asynchronous with the bus interconnect clock signal.

Another feature that can be provided in embodiments described herein and is described below in more detail with regard to FIG. 5 is the ability to allow each of the master ports 16(0-M) and slave ports 20(0-N) to be clocked independently from the bus interconnect clock signal 46. In this manner, each of the master ports 16(0-M) and slave ports 20(0-N) can operate at a different frequency from the frequency of the bus interconnect clock signal 46 in a synchronicity relationship to allow for flexibility in interconnecting master devices 14(0-M) with slave devices 18(0-N) which may have differing bandwidth needs. For example, as illustrated in FIG. 1, providing separate clock change circuits 52(0-M), 54(0-N) for each master port 16(0-M) and slave port 20(0-N), respectively, allows the frequencies of the master ports 16(0-M) and slave ports 20(0-N) to be independent of the frequency of the bus interconnect clock signal 46. Thus, the scaling of the bus interconnect clock signal 46 can be performed at the desired frequency to conserve power and reduce or avoid performance margin while allowing the master ports 16(0-M) and slave ports 20(0-N) to continue to operate at different frequencies, if desired. An example of the bus interconnect clock signal 46 operating at a different frequency from the master ports 16(0-M) is illustrated in FIG. 5. In this example, the bus interconnect clock signal 46 is operating at 100 MegaHertz (MHz). The master port clock signal 56(0) for the master port 16(0) is operating synchronously with the bus interconnect clock signal 46, meaning the operating edge is phase aligned at the same frequency, or 100 MHz in this example. Thus, the master port interface 28(0) can be configured as synchronous with the bus interconnect clock signal 46. In this regard, the master port interface 28(0) as configured does not introduce additional clock signals to synchronize to the bus interconnect clock signal 46 to perform transactions. The master port interface 28(0) for the master port 16(0) can perform transactions synchronously (i.e., at the same speed) with the bus interconnect clock signal 46 without requiring additional clock cycles of the bus interconnect clock signal 46 for synchronization and adding latency to transactions.

The master port clock signal 56(1) for the master port 16(1) in the example of FIG. 5 operates rising-edge synchronous with the bus interconnect clock signal 46. Rising-edge synchronous means that the rising edges of the master port clock signal 56(1) are synchronous with a rising edge of the bus interconnect clock signal 46, but not at the same operating frequency as the bus interconnect clock signal 46. This occurs when the bus interconnect clock signal 46 is an integer multiple/divisible of the master port clock signal 56(1). In this example, the master port clock signal 56(1) is operating at a frequency of 50 MHz, which is half the speed of the bus interconnect clock signal 46. Latency may be reduced if the master port interface 28(1) is configured as rising-edge synchronous as compared to asynchronous. However, if the next rising edge of the master port clock signal 56(1) after a transaction request by the master port interface 28(1) is synchronous with the next rising edge of the bus interconnect clock signal 46, the transaction can be performed for the master port interface 28(1) in the interconnect network 26 without additional latency.

The master port clock signal 56(2) for the master port 16(2) in the example of FIG. 5 is configured to operate asynchronous with the bus interconnect clock signal 46. Asynchronous means that the bus interconnect clock signal 46 is not an integer multiple/divisible of the master port clock signal 56(2). Thus, the master port clock signal 56(2) is asynchronous with the bus interconnect clock signal 46. For example, the master port clock signal 56(2) is operating at a frequency of 30 MHz in this example. For asynchronous operation, a transaction request by the master port interface 28(2) must be double synchronized by the bus interconnect clock signal 46, which may increase latency greater than rising-edge synchronicity.

If the frequency of the bus interconnect clock signal 46 is scaled, the master port interfaces 28(0-M) and slave port interfaces 40(0-N) are reconfigured, if necessary or advantageous from a power and/or performance perspective, to be compatible with the new frequency of the bus interconnect clock signal 46 to allow interfacing with the interconnect network 26. In this regard, embodiments disclosed herein allow the controller 42 to configure the master ports 16(0-M) and slave ports 20(0-N) as synchronous or rising-edge synchronous when the frequency of the bus interconnect clock signal 46 is scaled to reduce latency. When so configured, the frequencies of the master port clock signals 56(0-M) and slave port clock signals 58(0-N) may be scaled in proportion to the scaling of the bus interconnect clock signal 46, if such is possible, without impacting bandwidth performance of the master ports 16(0-M) and slave ports 20(0-N) outside of desired configurations. As a result, synchronization cycles in the bus interconnect 12 may be reduced or avoided when the bus interconnect clock signal 46 is scaled thus reducing latency. If configuring the master ports 16(0-M) and slave ports 20(0-N) as synchronous or rising-edge synchronous is not possible, the master ports 16(0-M) and slave ports 20(0-N) can be configured as asynchronous to the bus interconnect clock signal 46.

FIG. 6 is a flowchart illustrating an exemplary configuration of the port clock signals for synchronous, rising-edge synchronous, and asynchronous operation to the bus interconnect clock signal when the bus interconnect clock signal is scaled. The controller 42 determines for each master port 16(0-M) and slave port 20(0-N), based on configurations, if it is possible to configure any of the master ports 16(0-M) or slave ports 20(0-N) as synchronous with the new frequency of the bus interconnect clock signal 46 (block 121). If so, the controller 42 can also determine if the frequency change required to be made to the master port clock signals 56(0-M) or slave port clock signals 58(0-N) for such master ports 16(0-M) and slave ports 20(0-N), respectively, will violate any respective bandwidth conditions of such master ports 16(0-M) and slave ports 20(0-N) (block 122). If not, the controller 42 inhibits the necessary master and slave port queues 30(0-M), 34(0-N) that can be reconfigured to synchronous operation due to the change in frequency of the bus interconnect clock signal 46 (block 124). In this regard, these master port queues 30(0-M) and slave port queues 34(0-N) will not process bus transactions until these necessary master port interfaces 28(0-M) and slave port interfaces 40(0-N) are reconfigured (block 126), the bus interconnect clock signal 46 frequency is changed (block 128), and the necessary master and slave port queues 30(0-M), 34(0-N) are un-inhibited (block 129).

After it is determined if any master ports 16(0-M) and slave ports 20(0-N) can be configured for synchronous operation, the controller 42 determines if any of the master ports 16(0-M) and slave ports 20(0-N) can be configured for rising-edge synchronous operation with the new frequency of the bus interconnect clock signal 46 (block 131). If so, the controller 42 determines if the frequency change required to be made to the master or slave port clock signal 56(0-M), 58(0-N) for such master ports 16(0-M) and slave ports 20(0-N) will violate any respective bandwidth conditions of such master ports 16(0-M) and slave ports 20(0-N) (block 132). If not, the controller 42 inhibits the necessary master and slave port queues 30(0-M), 34(0-N) that can be reconfigured to rising-edge synchronous operation due to the change in frequency of the bus interconnect clock signal 46 (block 124). In this regard, these master port queues 30(0-M) and slave port queues 34(0-N) will not process bus transactions until these necessary master port interfaces 28(0-M) and slave port interfaces 40(0-N) are reconfigured (block 126), the bus interconnect clock signal 46 frequency is changed (block 128), and the necessary master and slave port queues 30(0-M), 34(0-N) are un-inhibited (block 129).

After it is determined if any master ports 16(0-M) and slave ports 20(0-N) can be configured for synchronous and rising-edge synchronous operation, the controller 42 configures any remaining master port interfaces and slave port interfaces 28(0-M), 40(0-N) for asynchronous operation (block 133) by performing blocks 124-130 for such master ports 16(0-M) and slave ports 20(0-N). The process thereafter ends (block 130).

Note that although FIG. 6 illustrates determining if master ports 16(0-M) and slave ports 20(0-N) can be configured for synchronous operation and rising-edge synchronous operation in serial fashion before configuring any remaining master ports 16(0-M) and slave ports 20(0-N) for asynchronous operation, this processing order is not required. For example, all master ports 16(0-M) and slave ports 20(0-N) could be initially configured for asynchronous operation where bus traffic is inhibited for all master ports 16(0-M) and slave ports 20(0-N) initially. Thereafter, it could be determined if any master ports 16(0-M) and slave ports 20(0-N) could be configured for synchronous and rising-edge synchronous operation.

Further, as another alternative, the controller 42 could change the configuration of all master port interfaces 28(0-M) and slave port interfaces 40(0-N) to asynchronous operation. This operation would be provided by the controller 42 if it is not desired to provide logic in the master port interfaces 28(0-M) and slave port interfaces 40(0-N) to provide synchronous and/or rising-edge synchronous operation and/or change the frequency of the master port clock signals 56(0-M) and slave port clock signals 58(0-N) in response to a change in frequency of the bus interconnect clock signal 46.

Figure 7:
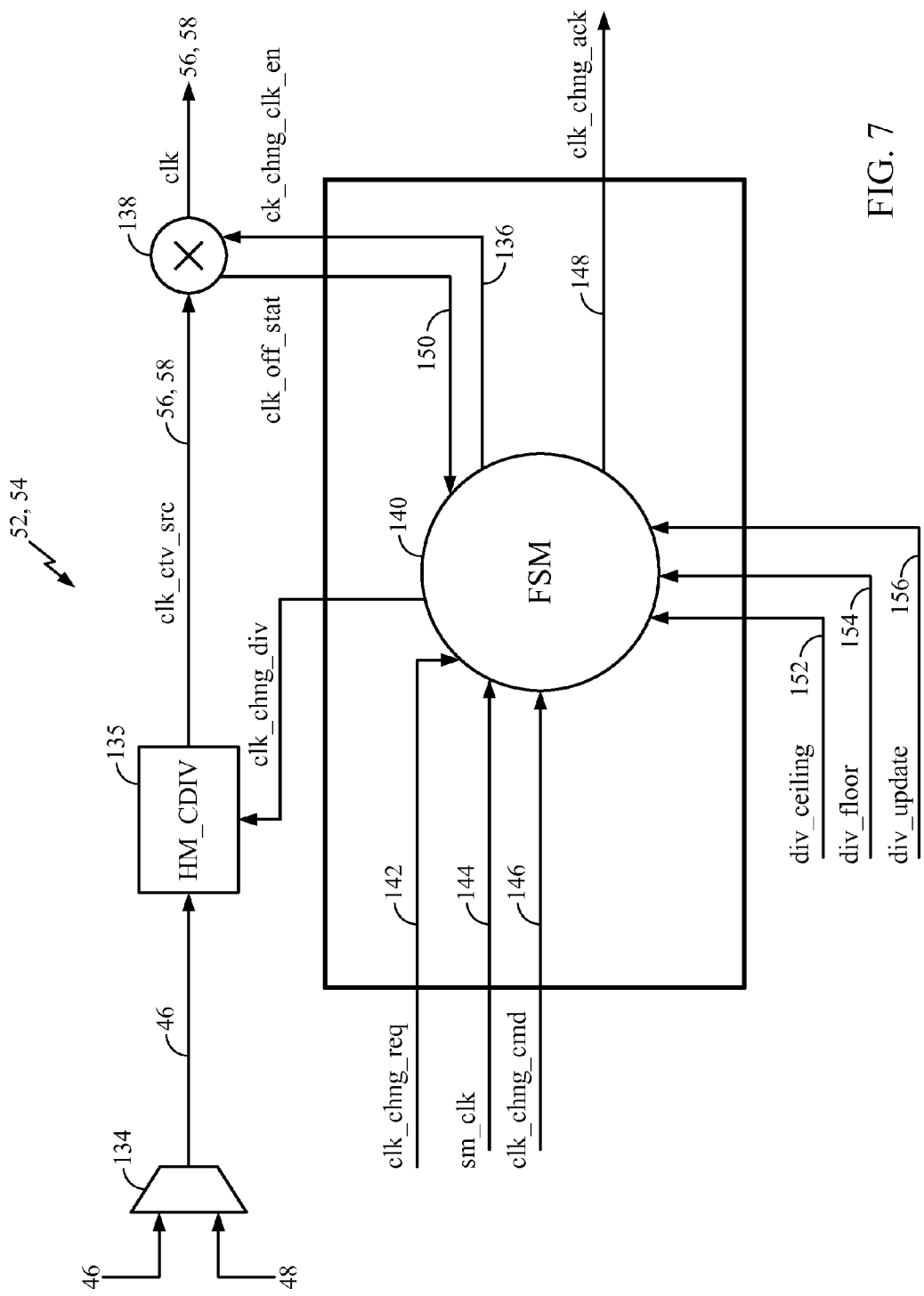
FIG. 7 is a block diagram of an exemplary clock change circuit that can scale the frequency of a port clock signal and/or the bus interconnect clock signal in the bus interconnect of FIG. 1.

FIG. 7 is a block diagram of an exemplary clock change circuit 52(0-M), 54(0-N) that can be used to scale the frequency of a port clock signal 56(0-M), 58(0-N), for example, as provided in block 128 of FIG. 6. The clock change circuit 52(0-M), 54(0-N) could also be employed in the controller 42 to scale the bus interconnect clock signal 46, if desired. In this regard, the clock change circuits 52(0-M), 54(0-N) are configured to receive both the clock source signal 48 and the bus interconnect clock signal 46. The clock change circuits 52(0-M), 54(0-N) could receive another clock signal. A multiplexer 134 will select one of these clock signals to be used by the clock change circuit 52(0-M), 54(0-N) to provide the port clock signals 56(0-M), 58(0-N). For discussion purposes herein, it will be assumed the multiplexer 134 selects the bus interconnect clock signal 46. The bus interconnect clock signal 46 is provided to a clock divider 135 to divide, and thus scale, the bus interconnect clock signal 46 to be provided as the port clock signal 56(0-M), 58(0-N). If a clock change clock enable signal (clk_chng_clk_en) 136 is active to enable a branch cell 138, the output of the clock divider 135 (clk_div_src) is provided as the port clock signal 56(0-M), 58(0-N).

A finite state machine (FSM) 140, which may be provided in circuitry or a combination of circuitry and software, controls the clock divider 135 to scale the frequencies of the port clock signal 56(0-M), 58(0-N). The FSM 140 also controls the clock change clock enable signal 136 to enable the port clock signal 56(0-M), 58(0-N) to be provided as an output of the branch cell 138. For example, it may be desired to stop the port clock signal(s) 56(0-M), 58(0-N) when a corresponding master port(s) 16(0-M) and/or slave port(s) 20(0-N) is not in use to conserve power. In this regard, the FSM 140 deactivates the clock change clock enable signal 136 to stop the port clock signal 56(0-M), 58(0-N).

To control the clock divider 135 to select the frequency of the port clock signal 56(0-M), 58(0-N), the FSM 140 is configured to receive as input a clock change request signal (clk_chng_req) 142, a local state machine clock signal (sm_clk) 144, and a clock change command from the controller 42 on clock change command signals (clk_chng_cmd) 146. The clock change command request indicates whether the port clock signal 56(0-M), 58(0-N) is to be stopped or the frequency increased or decreased. The FSM 140 can provide an indication of receipt and completion of such request on a clock change acknowledgement signal (clk_chng_ack) 148. The status of the port clock signal 56(0-M), 58(0-N) can be obtained by the FSM 140 via a clock off status signal (clk_off_stat) 150.

When the FSM 140 receives from the controller 42 in FIG. 1 the clock change request signal (clk_chng_req) 142 and the clock change command signals (clk_chng_cmd) 146 to increase or decrease the frequency of the port clock signal 56(0-M), 58(0-N), the FSM 140 controls the clock divider 135 to change the frequency of the bus interconnect clock signal 46 to produce the port clock signal 56(0-M), 58(0-N). The FSM 140 in this embodiment will not change the frequency of the port clock signal 56(0-M), 58(0-N) if the new frequency will go above a frequency ceiling, or below a frequency floor, as configured by the frequency ceiling and frequency floor signals (div_ceiling, div_floor) 152, 154, respectively. The FSM 140 will increment/decrement the frequency of the port clock signal 56(0-M), 58(0-N) in steps selected by the configuration on update signals (div_update) 156. If the clock change command request is to stop the port clock signal 56(0-M), 58(0-N), the FSM 140 deactivates the clock change clock enable signal 136.

Figure 8:
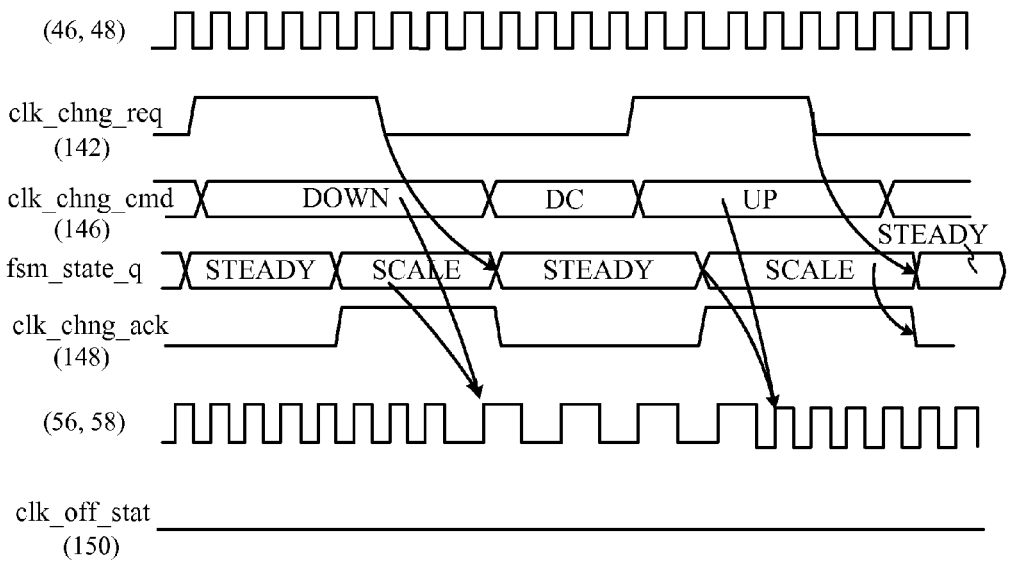
FIG. 8 is an exemplary timing diagram of the clock change circuit of FIG. 7 scaling a port clock signal and/or the bus interconnect clock signal.

FIG. 8 is an exemplary timing diagram of the clock change circuit of FIG. 7 scaling a port clock signal 56(0-M), 58(0-N) and/or the bus interconnect clock signal 46. As illustrated therein, the clock change request signal (clk_chng_req) 142 and the clock change command signal (clk_chng_cmd) 146 are asserted by the controller 42 to the clock change circuit 52(0-M), 54(0-N) in FIG. 7. The clock change command provides encoding to request the FSM 140 to decrease (DOWN) the frequency of the port clock signal 56(0-M), 58(0-N). In response, the FSM 140 asserts the clock change acknowledgement signal (clk_chng_ack) 148 and transitions from a "STEADY" state to a "SCALE" state. The frequency of the port clock signal 56(0-M), 58(0-N) is reduced by controlling the clock divider 135. The clock change acknowledgement signal (clk_chng_ack) 148 remains asserted until the frequency change request is completed. Thereafter, the clock change request signal (clk_chng_req) 142 is deasserted and the clock change command signal (clk_chng_cmd) 146 becomes a "DON'T CARE" (DC) to the FSM 140. Similarly, after the FSM 140 returns to a "STEADY" state, the controller 42 can instruct the clock change circuit 52(0-M), 54(0-N) to increase (UP) the frequency of the port clock signal 56(0-M), 58(0-N) as illustrated in FIG. 8. The clock off status signal (clk_off_stat) 150 indicates that the port clock signal 56(0-M), 58(0-N) is on.

Figure 9:
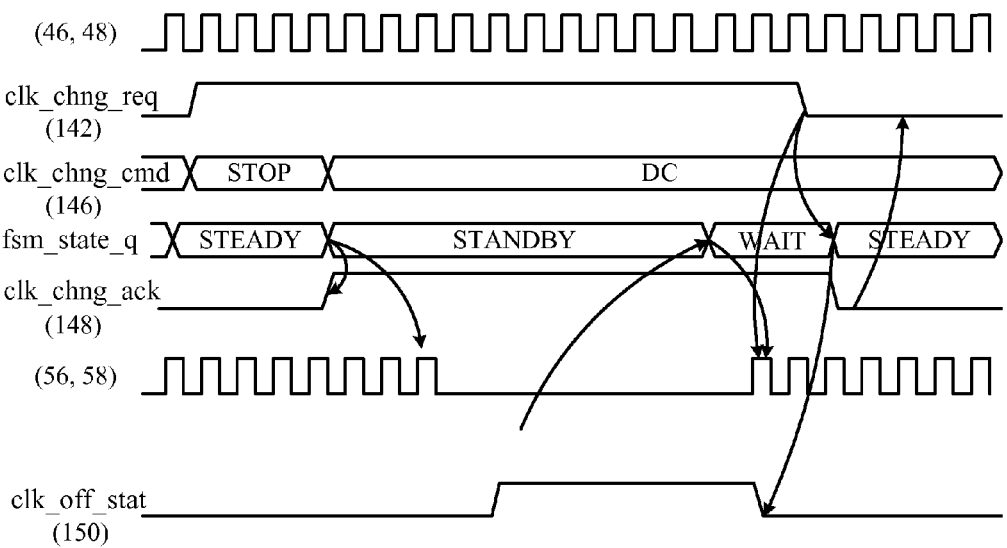
FIG. 9 is an exemplary timing diagram of the clock change circuit of FIG. 7 stopping a port clock signal and/or the bus interconnect clock signal.

FIG. 9 is an exemplary timing diagram of the clock change circuit of FIG. 7 stopping a port clock signal 56(0-M), 58(0-N). To stop the port clock signal 56(0-M), 58(0-N), the clock change request signal (clk_chng_req) 142, and clock change command signal (clk_chng_cmd) 146 are asserted by the controller 42 to the clock change circuit 52(0-M), 54(0-N) in FIG. 7. The clock change command signal (clk_chng_cmd) 146 provides encoding to request the FSM 140 to stop (STOP) the port clock signal 56(0-M), 58(0-N). In response, the FSM 140 asserts the clock change acknowledgement signal (clk_chng_ack) 148 and transitions from a "STEADY" state to a "STANDBY" state. The port clock signal 56(0-M), 58(0-N) is stopped by the FSM 140 deasserting the clock change enable signal (clk_chng_clk_en) 136 to the branch cell 138 in FIG. 7. The clock change acknowledgement signal (clk_chng_ack) 148 remains asserted until the stop request is deasserted. Thereafter, the clock change request signal (clk_chng_req) 142 remains asserted and the clock change command signal (clk_chng_cmd) 146 becomes a "DON'T CARE" (DC) to the FSM 140. The clock off status signal (clk_off_stat) 150 indicates that the port clock signal 56(0-M), 58(0-N) is stopped. The port clock signal 56(0-M), 58(0-N) can be restarted after the clock change request signal (clk_chng_req) 142 is deasserted, whereby the FSM 140 transitions from a "WAIT" state and then deasserts the clock change acknowledgement signal (clk_chng_ack) 148 and transitions to a "STEADY" state to wait for a new command.

The bus interconnect and related devices, systems, and methods and computer-readable mediums that support bus interconnect clock frequency scaling discussed herein may be used in any circuit or system, including but not limited to a synchronous digital circuit, CPU system, and a memory circuit or system. The memory circuit or system may be any type of memory. Examples include, without limitation, static random access memory (RAM) (SRAM), dynamic RAM (DRAM), synchronous DRAM (SDRAM), data-double-rate (DDR) SDRAM, data-double-rate-two (DDR2) SDRAM, data-double-rate-three (DDR3) SDRAM, Mobile DDR (MDDR) SDRAM, low-power (LP) DDR SDRAM, and LP DDR2 SDRAM. These forms of memory may also be computer-readable mediums that contain software instructions capable of determining the model output delay for clocked storage elements as discussed herein.

The bus interconnect and related devices, systems, and methods and computer-readable mediums that support bus interconnect clock frequency scaling discussed herein may be included or integrated in a semiconductor die, integrated circuit, and/or device, including an electronic device and/or processor-based device or system. In these regards, examples of such devices include, without limitation, a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player.

Figure 10:
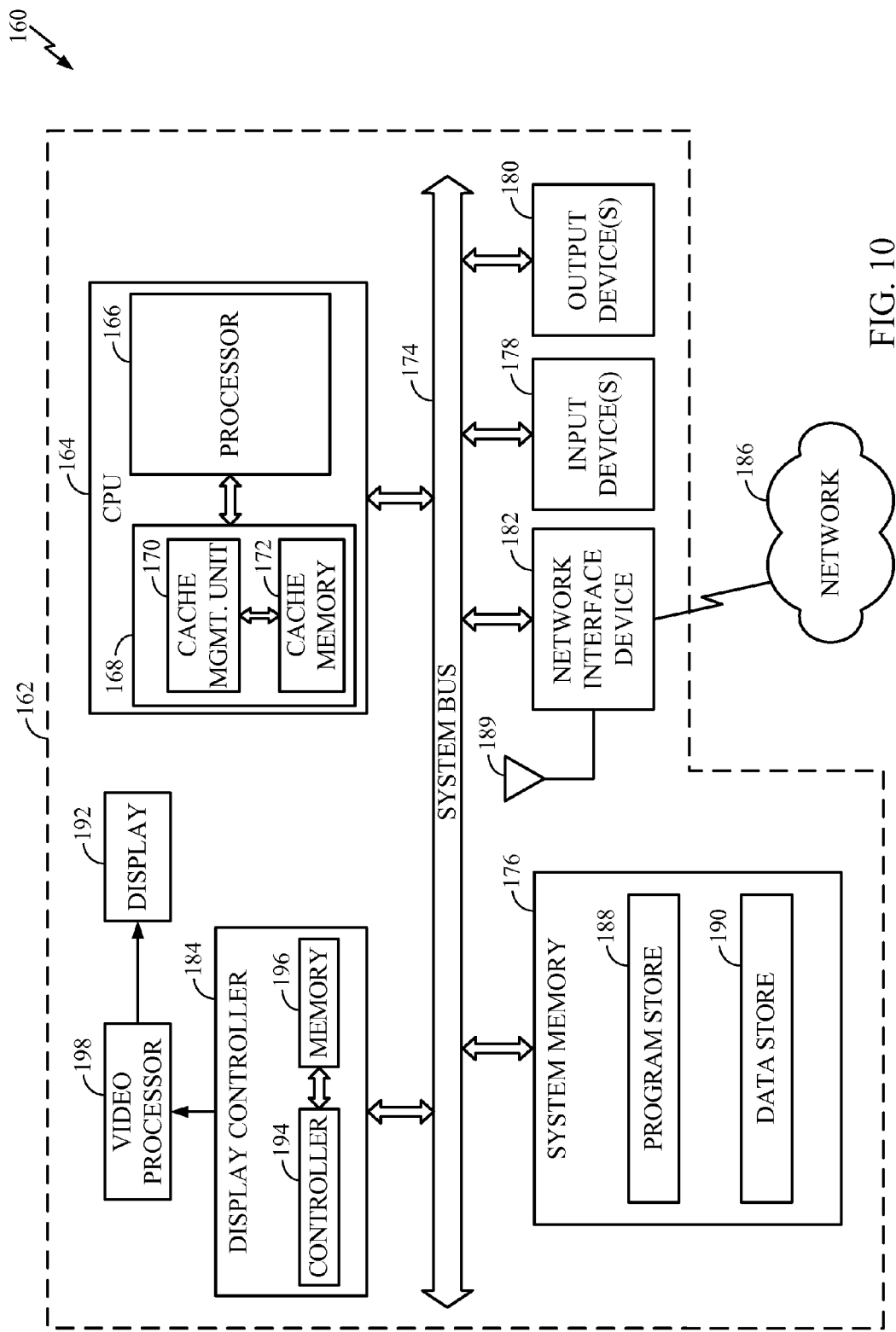
FIG. 10 is block diagram of an exemplary central processing unit (CPU) circuit and related system employing a bus interconnect according to the embodiments described herein.

In this regard, FIG. 10 illustrates a processor-based system 160 that may be included in an electronic device that may include the bus interconnect disclosed herein. The processor-based system 160 includes clocked storage elements that may be modeled using the timing model and model output delay determination embodiments provided herein. Also, the processor-based system 160 may execute software instructions that perform the timing modeling and model output delay determinations for other circuits. The software instructions may be provided in a computer-readable medium. The processor-based system 160 may be included in an electronic device 162, including any of those previously referenced above. In this example, the processor-based system 160 includes a CPU 164 that includes a processor 166 and an integrated cache system 168. The cache system 168 includes a cache management unit 170 that controls access to a cache memory 172 accessible to the processor 166 for rapid access to temporary storage for frequently accessed data. The CPU 164 is coupled to a system bus 174, which interconnects the other devices included in the processor-based system 160. As is well known, the CPU 164 communicates with these other devices by exchanging address, control, and data information over the system bus 174. These devices may include any types of devices. As illustrated in FIG. 10, these devices may include system memory 176, one or more input devices 178, one or more output devices 180, a network interface device 182, and a display controller 184, as examples. The system memory 176 is one example of a computer-readable medium.

The one or more input devices 178 may include any type of input device, including but not limited to input keys, switches, voice processors, memory drives, disks, compact disc (CD), digital video disc (DVD), etc. These input devices 178 may also be computer-readable mediums that contain software instructions. The one or more output devices 180 may include any type of output device, including but not limited to audio, video, other visual indicators, etc. The network interface device 182 may be any device configured to allow exchange of data to and from a network 186 via a wired connection or wirelessly over an antenna 187. The network 186 may be any type of network, including but not limited to the examples of a wired or wireless network, private or public network, a local area network (LAN), a wide local area network (WLAN), the Internet, a third generation (3G) network, and a fourth generation (4G) network. The network interface device 182 may support any type of communication protocol desired.

The CPU 164 may also access the system memory 176 over the system bus 174. The system memory 176 may include circuits and methods previously described above to access the system memory 176. The system memory 176 may include static memory and/or dynamic memory. The system memory 176 may include a program store 188 and a data store 190 for the CPU 164. The CPU 164 may also access the display controller 184 over the system bus 174 to control information sent to a display 192. The display controller 184 may include a memory controller 194 and memory 196 to store data to be sent to the display 192 in response to communications with the CPU 164. The display controller 184 sends information to the display 192 to be displayed via a video processor 198, which processes the information to be displayed into a format suitable for the display 192. The display 192 may include any type of display, including but not limited to a cathode ray tube (CRT), a liquid crystal display (LCD), a plasma display, etc.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a DSP, an application specific integrated circuit (ASIC), a field-programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in memory, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that a processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server. Any elements referred to herein as "signals" can also be circuit lines or traces, or other communications lines and provided on circuit lines or traces, or other communications lines.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A bus interconnect, comprising:
    an interconnect network configurable to connect at least one master port among a plurality of master ports to at least one slave port; and
    a controller configured to generate a bus interconnect clock signal to clock the interconnect network;
    wherein the controller is configured to:
        receive at least one first bandwidth information related to traffic communicated over the at least one master port;
        receive at least one second bandwidth information related to traffic communicated over the at least one slave port; and
        scale a frequency of the bus interconnect clock signal in response to at least one of:
            (a) the at least one first bandwidth information meeting a respective at least one first headroom bandwidth threshold; and
            (b) the at least one second bandwidth information meeting a respective at least one second headroom bandwidth threshold.

2. The bus interconnect of claim 1, wherein the controller is configured to scale the frequency of the bus interconnect clock signal by decreasing the frequency of the bus interconnect clock signal in response to the at least one first bandwidth information meeting the respective at least one first headroom bandwidth threshold, and the at least one second bandwidth information meeting the respective at least one second headroom bandwidth threshold.

3. The bus interconnect of claim 2, wherein the controller is configured to scale the frequency of the bus interconnect clock signal by decreasing the frequency of the bus interconnect clock signal in response to the at least one first bandwidth information being less than the respective at least one first headroom bandwidth threshold, and the at least one second bandwidth information being less than the respective at least one second headroom bandwidth threshold.

4. The bus interconnect of claim 1, wherein the controller is configured to scale the frequency of the bus interconnect clock signal by decreasing the frequency of the bus interconnect clock signal in response to:
    the at least one first bandwidth information for all of the plurality of master ports meeting the respective at least one first headroom bandwidth threshold; and
    the at least one second bandwidth information for the at least one slave port meeting the respective at least one second headroom bandwidth threshold.

5. The bus interconnect of claim 1, wherein the controller is configured to scale the frequency of the bus interconnect clock signal by increasing the frequency of the bus interconnect clock signal in response to the at least one first bandwidth information not meeting the respective at least one first headroom bandwidth threshold, or the at least one second bandwidth information not meeting the respective at least one second headroom bandwidth threshold.

6. The bus interconnect of claim 5, wherein the controller is configured to scale the frequency of the bus interconnect clock signal by increasing the frequency of the bus interconnect clock signal in response to the at least one first bandwidth information being greater than the respective at least one first headroom bandwidth threshold, or the at least one second bandwidth information being greater than the respective at least one second headroom bandwidth threshold.

7. The bus interconnect of claim 1, wherein the at least one first headroom bandwidth threshold is comprised of a respective first read headroom bandwidth threshold and a respective first write headroom bandwidth threshold.

8. A method of scaling a bus interconnect clock signal for a bus interconnect, comprising:
    receiving at least one first bandwidth information related to traffic communicated over at least one master port among a plurality of master ports connected to an interconnect network that is configured to connect the at least one master port to at least one slave port;
    receiving at least one second bandwidth information related to traffic communicated over the at least one slave port; and
    scaling a frequency of a bus interconnect clock signal clocking the interconnect network in response to at least one of:
        (a) the at least one first bandwidth information meeting a respective at least one first headroom bandwidth threshold; and
        (b) the at least one second bandwidth information meeting a respective at least one second headroom bandwidth threshold.

9. The method of claim 8, wherein scaling the frequency of the bus interconnect clock signal comprises decreasing the frequency of the bus interconnect clock signal in response to the at least one first bandwidth information meeting the respective at least one first headroom bandwidth threshold, and the at least one second bandwidth information meeting the respective at least one second headroom bandwidth threshold.

10. The method of claim 9, wherein scaling the frequency of the bus interconnect clock signal comprises decreasing the frequency of the bus interconnect clock signal in response to the at least one first bandwidth information being less than the respective at least one first headroom bandwidth threshold, and the at least one second bandwidth information being less than the respective at least one second headroom bandwidth threshold.

11. The method of claim 8, wherein scaling the frequency of the bus interconnect clock signal comprises decreasing the frequency of the bus interconnect clock signal in response to:
the at least one first bandwidth information for all of the plurality of master ports meeting the respective at least one first headroom bandwidth threshold; and
the at least one second bandwidth information for of the at least one slave port meeting the respective at least one second headroom bandwidth threshold.

12. The method of claim 8, wherein scaling the frequency of the bus interconnect clock signal comprises increasing the frequency of the bus interconnect clock signal in response to the at least one first bandwidth information not meeting the respective at least one first headroom bandwidth threshold, or the at least one second bandwidth information not meeting the respective at least one second headroom bandwidth threshold.

13. The method of claim 12, wherein increasing the frequency of the bus interconnect clock signal comprises increasing the frequency of the bus interconnect clock signal in response to the at least one first bandwidth information being greater than the respective at least one first headroom bandwidth threshold, or the at least one second bandwidth information being greater than the respective at least one second headroom bandwidth threshold.

14. The method of claim 8, wherein the respective at least one first headroom bandwidth threshold is comprised of a respective first read headroom bandwidth threshold and a respective first write headroom bandwidth threshold.

15. A bus interconnect, comprising:
an interconnect network configurable to connect at least one master port among a plurality of master ports to at least one slave port; and
a controller configured to generate a bus interconnect clock signal to clock the interconnect network;
wherein the controller is configured to:
receive at least one first bandwidth information related to traffic communicated over the at least one master port;
receive at least one second bandwidth information related to traffic communicated over the at least one slave port;
receive at least one latency information related to traffic communicated over the at least one master port; and
scale a frequency of the bus interconnect clock signal in response to the at least one latency information meeting a respective latency condition and at least one of:
(a) the at least one first bandwidth information meeting a respective at least one first bandwidth condition; and
(b) the at least one second bandwidth information meeting a respective at least one second bandwidth condition.

16. The bus interconnect of claim 15, wherein the controller is configured to scale the frequency of the bus interconnect clock signal by decreasing the frequency of the bus interconnect clock signal additionally in response to the at least one latency information meeting the respective latency condition.

17. The bus interconnect of claim 16, wherein the controller is configured to decrease the frequency of the bus interconnect clock signal additionally in response to the respective at least one latency information being less than a respective at least one maximum latency threshold.

18. The bus interconnect of claim 16, wherein the controller is further configured to decrease the frequency of the bus interconnect clock signal additionally in response to the at least one latency information for all of the plurality of master ports meeting the respective latency condition.

19. The bus interconnect of claim 15, wherein the respective latency condition is comprised of a maximum read latency threshold and a maximum write latency threshold.

20. A method of scaling a bus interconnect clock signal for a bus interconnect, comprising:
receiving at least one first bandwidth information related to traffic communicated over at least one master port among a plurality of master ports connected to an interconnect network that is configured to connect the at least one master port to at least one slave port;
receiving at least one second bandwidth information related to traffic communicated over the at least one slave port;
receiving at least one latency information related to traffic communicated over the at least one master port; and
scaling a frequency of a bus interconnect clock signal clocking the interconnect network in response to the at least one latency information meeting a respective latency condition and at least one of:
(a) the at least one first bandwidth information meeting a respective at least one first bandwidth condition; and
(b) the at least one second bandwidth information meeting a respective at least one second bandwidth condition.

21. The method of claim 20, wherein scaling the frequency of the bus interconnect clock signal comprises decreasing the frequency of the bus interconnect clock signal in response to the at least one latency information meeting the respective latency condition.

22. The method of claim 21, wherein scaling the frequency of the bus interconnect clock signal comprises decreasing the frequency of the bus interconnect clock signal in response to the at least one latency information being less than a respective at least one maximum latency threshold.

23. The method of claim 20, wherein scaling the frequency of the bus interconnect clock signal comprises decreasing the frequency of the bus interconnect clock signal in response to the at least one latency information for all of the plurality of master ports meeting the respective latency condition.

24. The method of claim 20, where the respective latency condition is comprised of a maximum read latency threshold and a maximum write latency threshold.

25. The bus interconnect of claim 1, wherein the controller is configured to receive the at least one first bandwidth information configured uniquely to the at least one master port over the at least one master port.

26. The bus interconnect of claim 1, wherein the controller is configured to receive the at least one second bandwidth information configured uniquely to the at least one slave port over the at least one slave port.

27. The bus interconnect of claim 1, further comprising:
at least one master port clock generator configured to generate at least one master port clock signal to clock the at least one master port; and
at least one slave port clock generator configured to generate at least one slave port clock signal to clock the at least one slave port.

28. The bus interconnect of claim 27, wherein the controller is further configured to configure one or more of the at least one master port clock signal and the at least one slave port clock signal to be synchronous with the bus interconnect clock signal.

29. The bus interconnect of claim 27, wherein the controller is further configured to configure one or more of the at least one master port clock signal and the at least one slave port clock signal to be rising-edge synchronous with the bus interconnect clock signal.

30. The bus interconnect of claim 27, wherein the controller is further configured to configure one or more of the at least one master port clock signal and the at least one slave port clock signal to be asynchronous with the bus interconnect clock signal.

31. The bus interconnect of claim 27, wherein at least one of the at least one master port clock generator and the at least one slave port clock generator is the controller.

32. The bus interconnect of claim 27, wherein the at least one master port clock signal and the at least one slave port clock signal are generated from the bus interconnect clock signal.

33. The bus interconnect of claim 27, wherein the controller is further configured to stop one or more of the at least one master port clock generator and the at least one slave port clock generator for one or more of the at least one master port and the at least one slave port that is to be reconfigured before the frequency of the bus interconnect clock signal is scaled.

34. The bus interconnect of claim 27 integrated in at least one semiconductor die.

35. The bus interconnect of claim 27, further comprising a device selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, into which the bus interconnect is integrated.

36. The method of claim 8, further comprising:
generating at least one master port clock signal to clock the at least one master port; and
generating at least one slave port clock signal to clock the at least one slave port.

37. The method of claim 36, further comprising configuring one or more of the at least one master port clock signal and the at least one slave port clock signal to be synchronous with the bus interconnect clock signal.

38. The method of claim 36, further comprising configuring one or more of the at least one master port clock signal and the at least one slave port clock signal to be rising-edge synchronous with the bus interconnect clock signal.

39. The method of claim 36, further comprising configuring one or more of the at least one master port clock signal and the at least one slave port clock signal to be asynchronous with the bus interconnect clock signal.

40. The method of claim 36, further comprising stopping generating of one or more of at least one master port clock generator and at least one slave port clock generator for one or more of the at least one master port and the at least one slave port that is to be reconfigured before scaling the frequency of the bus interconnect clock signal.

41. The bus interconnect of claim 15, further comprising:
at least one master port clock generator configured to generate at least one master port clock signal to clock the at least one master port; and
at least one slave port clock generator configured to generate at least one slave port clock signal to clock the at least one slave port.

42. The bus interconnect of claim 41, wherein the controller is further configured to configure one or more of the at least one master port clock signal and the at least one slave port clock signal to be synchronous with the bus interconnect clock signal.

43. The bus interconnect of claim 41, wherein the controller is further configured to configure one or more of the at least one master port clock signal and the at least one slave port clock signal to be rising-edge synchronous with the bus interconnect clock signal.

44. The bus interconnect of claim 41, wherein the controller is further configured to configure one or more of the at least one master port clock signal and the at least one slave port clock signal to be asynchronous with the bus interconnect clock signal.

45. The bus interconnect of claim 41, wherein at least one of the at least one master port clock generator and the at least one slave port clock generator is the controller.

46. The bus interconnect of claim 41, wherein the at least one master port clock signal and the at least one slave port clock signal are generated from the bus interconnect clock signal.

47. The bus interconnect of claim 41, wherein the controller is further configured to stop one or more of the at least one master port clock generator and the at least one slave port clock generator for one or more of the at least one master port and the at least one slave port that is to be reconfigured before the frequency of the bus interconnect clock signal is scaled.

48. The bus interconnect of claim 41 integrated in at least one semiconductor die.

49. The bus interconnect of claim 41, further comprising a device selected from the group consisting of a set top box, an entertainment unit, a navigation device, a communications device, a personal digital assistant (PDA), a fixed location data unit, a mobile location data unit, a mobile phone, a cellular phone, a computer, a portable computer, a desktop computer, a monitor, a computer monitor, a television, a tuner, a radio, a satellite radio, a music player, a digital music player, a portable music player, a video player, a digital video player, a digital video disc (DVD) player, and a portable digital video player, into which the bus interconnect is integrated.

50. The method of claim 20, further comprising:
generating at least one master port clock signal to clock the at least one master port; and
generating at least one slave port clock signal to clock the at least one slave port.

51. The method of claim 50, further comprising configuring one or more of the at least one master port clock signal and the at least one slave port clock signal to be synchronous with the bus interconnect clock signal.

52. The method of claim 50, further comprising configuring one or more of the at least one master port clock signal and the at least one slave port clock signal to be rising-edge synchronous with the bus interconnect clock signal.

53. The method of claim 50, further comprising configuring one or more of the at least one master port clock signal and the at least one slave port clock signal to be asynchronous with the bus interconnect clock signal.

54. The method of claim 50, further comprising stopping generating of one or more of at least one master port clock generator and at least one slave port clock generator for one or more of the at least one master port and the at least one slave port that is to be reconfigured before scaling the frequency of the bus interconnect clock signal.

55. A non-transitory computer-readable medium having stored thereon computer executable instructions to cause a processor to:
- connect at least one master port among a plurality of master ports through a bus interconnect comprising an interconnect network to at least one slave port to scale a frequency of a bus interconnect clock signal clocking the interconnect network based on a comparison of at least one of:
  - (a) at least one first bandwidth information related to traffic communicated over the at least one master port and a respective at least one first headroom bandwidth threshold; and
  - (b) at least one second bandwidth information related to traffic communicated over the at least one slave port and a respective at least one second headroom bandwidth threshold.

56. The non-transitory computer-readable medium of claim 55, wherein computer executable instructions further cause the processor to scale the frequency of the bus interconnect clock signal by decreasing the frequency of the bus interconnect clock signal in response to the at least one first bandwidth information meeting the respective at least one first headroom bandwidth threshold, and the at least one second bandwidth information meeting the respective at least one second headroom bandwidth threshold.

57. The non-transitory computer-readable medium of claim 56, wherein computer executable instructions further cause the processor to scale the frequency of the bus interconnect clock signal by decreasing the frequency of the bus interconnect clock signal in response to the at least one first bandwidth information being less than the respective at least one first headroom bandwidth threshold, and the at least one second bandwidth information being less than the respective at least one second headroom bandwidth threshold.

58. The non-transitory computer-readable medium of claim 55, wherein computer executable instructions further cause the processor to scale the frequency of the bus interconnect clock signal by decreasing the frequency of the bus interconnect clock signal in response to:
- the at least one first bandwidth information for all of the plurality of master ports meeting the respective at least one first headroom bandwidth threshold; and
- the at least one second bandwidth information for all of the at least one slave port meeting the respective at least one second headroom bandwidth threshold.

59. The non-transitory computer-readable medium of claim 55, wherein computer executable instructions further cause the processor to scale the frequency of the bus interconnect clock signal by increasing the frequency of the bus interconnect clock signal in response to the at least one first bandwidth information not meeting the respective at least one first headroom bandwidth threshold, or the at least one second bandwidth information not meeting the respective at least one second headroom bandwidth threshold.

60. The non-transitory computer-readable medium of claim 59, wherein computer executable instructions causes the processor to increase the frequency of the bus interconnect clock signal by increasing the frequency of the bus interconnect clock signal in response to the at least one first bandwidth information being greater than the respective at least one first headroom bandwidth threshold, or the at least one second bandwidth information being greater than the respective at least one second headroom bandwidth threshold.

61. The non-transitory computer-readable medium of claim 55, wherein the respective at least one first headroom bandwidth threshold is comprised of a respective first read headroom bandwidth threshold and a respective first write headroom bandwidth threshold.

62. A non-transitory computer-readable medium having stored thereon computer executable instructions to cause a processor to:
- connect at least one master port among a plurality of master ports through a bus interconnect comprising an interconnect network to at least one slave port to scale a frequency of a bus interconnect clock signal clocking the interconnect network in response to at least one latency information meeting a respective latency condition and at least one of:
  - (a) at least one first bandwidth information related to traffic communicated over the at least one master port and a respective at least one first bandwidth condition; and
  - (b) at least one second bandwidth information related to traffic communicated over the at least one slave port and a respective at least one second bandwidth condition.

63. The non-transitory computer-readable medium of claim 62, wherein computer executable instructions further cause the processor to scale the frequency of the bus interconnect clock signal by decreasing the frequency of the bus interconnect clock signal in response to the at least one latency information meeting the respective latency condition.

64. The non-transitory computer-readable medium of claim 63, wherein computer executable instructions further cause the processor to scale the frequency of the bus interconnect clock signal by decreasing the frequency of the bus interconnect clock signal in response to the at least one latency information being less than a respective at least one maximum latency threshold.

65. The non-transitory computer-readable medium of claim 62, wherein computer executable instructions further cause the processor to scale the frequency of the bus interconnect clock signal by decreasing the frequency of the bus interconnect clock signal in response to the at least one latency information for all of the plurality of master ports meeting the respective latency condition.

66. The non-transitory computer-readable medium of claim 62, wherein the respective latency condition is comprised of a maximum read latency threshold and a maximum write latency threshold.

67. A bus interconnect, comprising:
- a means for receiving at least one first bandwidth information related to traffic communicated over at least one master port among a plurality of master ports connected to an interconnect network that is configured to connect the at least one master port to at least one slave port;
- a means for receiving at least one second bandwidth information related to traffic communicated over the at least one slave port; and
- a means for scaling a frequency of a bus interconnect clock signal clocking the interconnect network in response to at least one of:
  - (a) the at least one first bandwidth information meeting a respective at least one first headroom bandwidth threshold; and
  - (b) the at least one second bandwidth information meeting a respective at least one second headroom bandwidth threshold.

68. A bus interconnect, comprising:
- a means for receiving at least one first bandwidth information related to traffic communicated over at least one master port among a plurality of master ports connected to an interconnect network that is configured to connect the at least one master port to at least one slave port;

a means for receiving at least one second bandwidth information related to traffic communicated over the at least one slave port;

a means for receiving at least one latency information related to traffic communicated over the at least one master port; and a means for scaling a frequency of a bus interconnect clock signal clocking the interconnect network in response to the at least one latency information meeting a respective latency condition and at least one of:
  (a) the at least one first bandwidth information meeting a respective at least one first bandwidth condition; and
  (b) the at least one second bandwidth information meeting a respective at least one second bandwidth condition.

* * * * *